(12) United States Patent
Lee

(10) Patent No.: US 11,876,872 B2
(45) Date of Patent: Jan. 16, 2024

(54) METHOD, DEVICE AND COMPUTER PROGRAM FOR COMMUNICATING INFORMATION RELATING TO WIRELESS POWER TRANSMISSION, AND RECORDING MEDIUM THEREOF

(71) Applicant: INTELLECTUAL DISCOVERY CO., LTD., Seoul (KR)

(72) Inventor: Jeaho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 17/640,672

(22) PCT Filed: Sep. 3, 2020

(86) PCT No.: PCT/KR2020/011851
§ 371 (c)(1),
(2) Date: Mar. 4, 2022

(87) PCT Pub. No.: WO2021/045526
PCT Pub. Date: Mar. 11, 2021

(65) Prior Publication Data
US 2022/0407932 A1 Dec. 22, 2022

(30) Foreign Application Priority Data
Sep. 4, 2019 (KR) .......................... 10-2019-0109413

(51) Int. Cl.
*H04L 69/00* (2022.01)
*H04L 67/51* (2022.01)
(Continued)

(52) U.S. Cl.
CPC .............. *H04L 67/51* (2022.05); *H02J 50/12* (2016.02); *H02J 50/80* (2016.02); *H04L 69/03* (2013.01); *H04W 4/80* (2018.02)

(58) Field of Classification Search
CPC . H04W 4/80; H04W 4/23; H02J 50/80; H02J 50/12; H04L 67/51; H04L 69/03; H04L 69/00
See application file for complete search history.

(56) References Cited

U.S. PATENT DOCUMENTS

| 9,923,603 B2 * | 3/2018 | Won .................. H02J 50/60 |
| 2016/0191121 A1 | 6/2016 | Bell et al. | |
| 2018/0205257 A1 * | 7/2018 | Kwon ................ H02J 50/12 |

FOREIGN PATENT DOCUMENTS

| KR | 10-2014-0124706 A | 10/2014 |
| KR | 10-2016-0025314 A | 3/2016 |

(Continued)

OTHER PUBLICATIONS

International Search Report for PCT/KR2020/011851 dated, Dec. 8, 2020 (PCT/ISA/210).

*Primary Examiner* — Tuan H Nguyen
(74) *Attorney, Agent, or Firm* — Sughrue Mion, PLLC

(57) ABSTRACT

The present disclosure relates to a method, device and computer program for communicating information relating to wireless power transmission, and a recording medium thereof. A quick discovery method by means of out-of-band (OOB) in a wireless power transmission system according to an embodiment of the present disclosure can comprise the steps in which: a power transmitter (PTX) receives one or more advertisement data items from a power receiver (PRX) in the OOB; the PTX obtains a first service or characteristic of the PRX in the OOB on the basis of the advertisement data items; power transmission from the PTX to the PRX is initiated in-band on the basis of the first service or characteristic; and the PTX obtains a second service or characteristic of the PRX in the OOB after the power transmission has been initiated.

18 Claims, 16 Drawing Sheets

(51) Int. Cl.
 *H02J 50/80* (2016.01)
 *H02J 50/12* (2016.01)
 *H04W 4/80* (2018.01)

(56) References Cited

FOREIGN PATENT DOCUMENTS

KR  10-2017-0021011 A  2/2017
KR  10-2018-0028175 A  3/2018

* cited by examiner

FIG. 3A

| CtrData | | | | | |
|---|---|---|---|---|---|
| WinSize (1 octet) | WinOffset (2 octets) | Interval (2 octets) | Latency (2 octets) | Timeout (2 octets) | Instant (2 octets) |

FIG. 3B

| CtrData | | | | | | | | | | | |
|---|---|---|---|---|---|---|---|---|---|---|---|
| Interval_Min (2 octets) | Interval_Max (2 octets) | Latency (2 octets) | Timeout (2 octets) | PreferredPeriodicity (1 octet) | ReferenceConnEventCount (2 octets) | Offset0 (2 octets) | Offset1 (2 octets) | Offset2 (2 octets) | Offset3 (2 octets) | Offset4 (2 octets) | Offset5 (2 octets) |

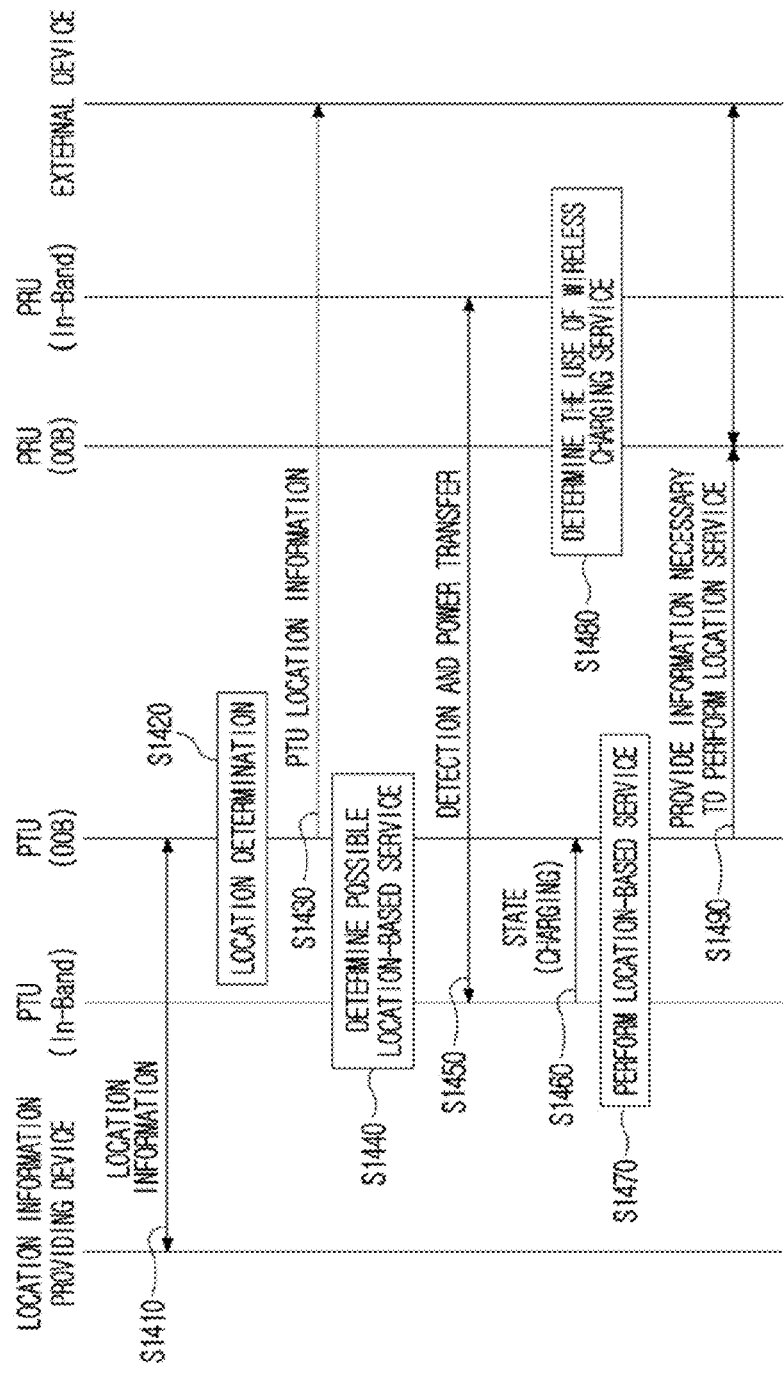

METHOD, DEVICE AND COMPUTER PROGRAM FOR COMMUNICATING INFORMATION RELATING TO WIRELESS POWER TRANSMISSION, AND RECORDING MEDIUM THEREOF

CROSS-REFERENCE TO RELATED APPLICATION

This application is a National Stage of International Application No. PCT/KR2020/011851 filed on Sep. 3, 2020 claiming priority from Korean Patent Application No. 10-2019-0109413 filed on Sep. 4, 2019 in the Korean Intellectual Property Office, the disclosure of which is incorporated herein in its entirety by reference.

TECHNICAL FIELD

The present disclosure relates to communication in a wireless power transfer system, and specifically, to a method, an apparatus, a computer program, and a recording medium thereof for transmitting and receiving information related to wireless power transfer.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

Wireless power transfer technology includes a magnetic induction method using a magnetic induction phenomenon between a primary coil and a secondary coil, and a magnetic resonance method in which magnetic resonance is achieved using a frequency of several tens of kHz to several MHz bands to transmit power.

In addition, communication between a power transfer unit (PTU or PTx) and a power receiving unit (PRU or PRx) is required in a wireless power transfer system. In the existing wireless power transfer system, it is possible to support in-band communication in which various information is transmitted and received on a band or channel used for wireless power transfer. In-band communication is not suitable for transmitting and receiving quick and large-capacity data required in an advanced wireless power transfer system because there are limitations due to low transfer speed and low transfer capacity. Therefore, a technology for transmitting and receiving information in an out-of-band (OOB) method rather than a band or channel used for wireless power transfer is required, and a BLE wireless communication system may be used as the OOB technology.

In addition, in order to apply BLE as an OOB technology for communication in a wireless power transfer system, it is required to define a new protocol for transmitting and receiving information related to wireless power transfer on a BLE wireless communication system.

DISCLOSURE

Technical Problem

A technical problem of the present disclosure is to provide a method and an apparatus for updating a connection according to a state change of one or more of a power transmitter and a power receiver in a wireless power transfer system.

An additional technical problem of the present disclosure is to provide a quick discovery method and apparatus for early wireless power transfer in a wireless power transfer system.

An additional technical problem of the present disclosure is to provide a method and an apparatus for a location-based service in a wireless power transfer system.

An additional technical problem of the present disclosure is to provide a discovery method and apparatus according to whether power is limited in a wireless power transfer system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

According to an aspect of the present disclosure, a method for quick discovery and service connection through out-of-band (OOB) in a wireless power transfer system may include: receiving, by a power transmitter (PTx), at least one advertisement data from a power receiver (PRx) in the OOB; obtaining, by the PTx, a first service or characteristic of the PRx in the OOB, based on the advertisement data; initiating power transfer from the PTx to the PRx in in-band based on the first service or characteristic; and obtaining, by the PTx, a second service or characteristic of the PRx in the OOB, after initiating the power transfer.

According to an additional aspect of the present disclosure, a power transmitter (PTx) that performs quick discovery and service connection through out-of-band (OOB) in a wireless power transfer system may include: an OOB module for performing signal transmission and reception through the OOB; an in-band module for performing signal and power transmission and reception through in-band; and a processor for controlling the OOB module and the in-band module. The processor may be configured to: receive at least one advertisement data from a power receiver (PRx) through the OOB module; obtain a first service or characteristic of the PRx through the OOB module, based on the advertisement data; initiate power transfer to the PRx through the in-band module based on the first service or characteristic; obtain the second service or characteristic of the PRx through the OOB module after initiating the power transfer.

The features briefly summarized above with respect to the present disclosure are merely exemplary aspects of the detailed description of the present disclosure that follows, and do not limit the scope of the present disclosure.

Technical Effects

According to the present disclosure, a method and apparatus for updating a connection according to a state change of one or more of a power transmitter or a power receiver in a wireless power transfer system may be provided.

According to the present disclosure, a quick discovery method and apparatus for early wireless power transfer in a wireless power transfer system may be provided.

According to the present disclosure, a method and apparatus for a location-based service in a wireless power transfer system may be provided.

According to the present disclosure, a discovery method and apparatus according to whether power is limited in a wireless power transfer system may be provided.

The technical effects of the present disclosure are not limited to the above-described effects, and other effects not mentioned herein may be understood to those skilled in the art from the following description.

BRIEF DESCRIPTION OF DRAWINGS

FIGS. 3A and 3B are diagrams for describing an example of a parameter used for connection parameter update to which the present disclosure is applicable.

FIG. 14 is a diagram for describing a location-based wireless power transfer method to which the present disclosure is applicable.

BEST MODE

Figure 1:
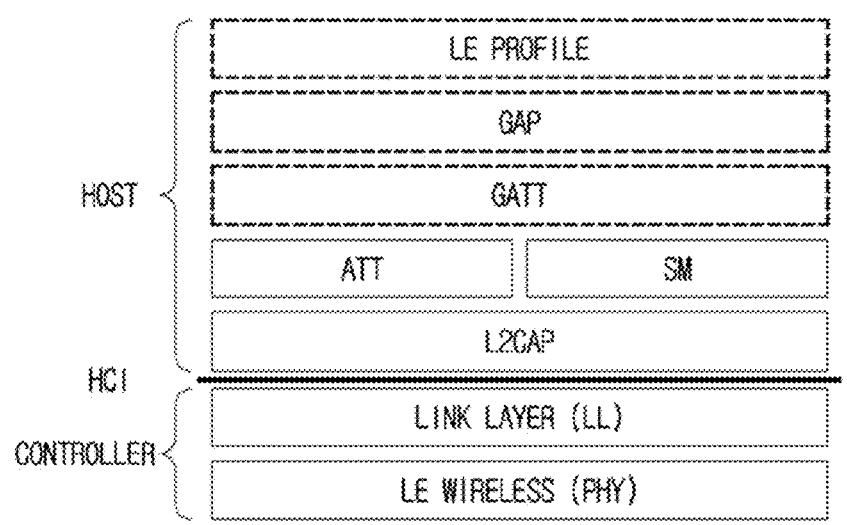
FIG. 1 is a diagram illustrating a BLE protocol stack to which the present disclosure is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Hereinafter, a method for wireless communication in the wireless power transfer system according to the present disclosure will be described.

FIG. 1 is a diagram illustrating a BLE protocol stack to which the present disclosure is applicable.

The BLE protocol stack may be composed of a lower layer controller stack and an upper layer host stack based on a host controller interface (HCI). The controller stack may generally run on hardware, and the host stack may typically run on software.

Information transmitted from the host to the controller may be referred to as an HCI command packet. Information transmitted from the controller to the host may be referred to as an HCI event packet.

The controller stack may include an LE radio (Radio) layer and a link layer (Link Layer, LL). The controller stack may also be referred to as a core stack.

The LE radio layer (i.e., the physical (PHY) layer) is responsible for transmitting and receiving data on the physical medium.

The LL is responsible for a function of link control, negotiation, and establishment, a function of selecting a frequency and transmitting data, and a function of supporting various topologies and various methods of exchanging data.

The host stack may include Logical-Link Control and Adaptation Protocol (L2CAP), Attribute protocol (ATT), Security Manager (SM), Generic Attribute Profile (GATT), Generic Access Profile (GAP), and LE profiles.

L2CAP is responsible for the interface function between the upper layer and the lower layer (e.g., the function of arbitration and coordination between the upper layer and the lower layer).

ATT is responsible for discovering, reading, and writing about attributes between devices according to server and client models.

The SM is responsible for defining procedures for pairing, authentication, encryption, and the like between devices.

GATT is responsible for defining the structure for services and characteristics based on attributes, defining a method of discovering, reading, writing, notifying, and indicating a characteristic, and defining the configuration method for attribute broadcast.

GAP defines basic functions common to all devices related to device discovery, connectivity, security, etc.

The LE profile is a profile based on GATT, and may include, for example, a profile for battery, time, proximity, and the like.

FIGS. 2A to 2D are diagrams illustrating a packet format for each layer to which the present disclosure is applicable.

Figures 2A, 2B, 2C, 2D:
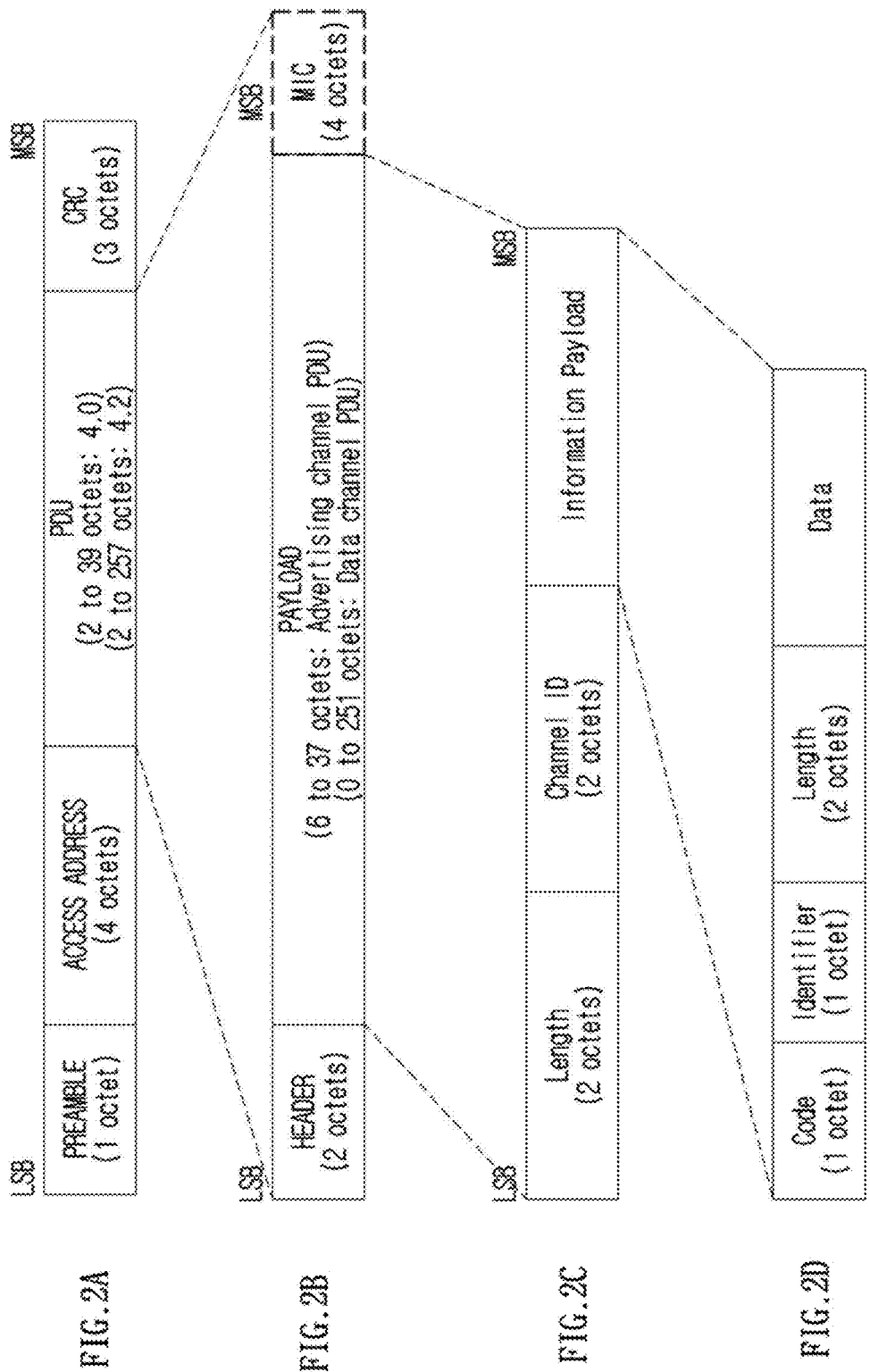
FIGS. 2A to 2D are diagrams illustrating a packet format for each layer to which the present disclosure is applicable.

FIG. 2A illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 2B illustrates an exemplary format of the PDU of FIG. 2A. PDU may be defined in two types, one is a data channel PDU (Data channel PDU), the other is an advertising channel PDU (Advertising channel PDU).

The advertising channel PDU may be used to transmit packets on an advertising physical channel (e.g., channel numbers 37, 38, 39). The advertising channel PDU may consist of a header of 2 octets and a payload of 6 to 37 octets. In this case, the header may include a PDU type, a Reserved for Future Use (RFU), a transmission address (TxAdd), a reception address (RxAdd), a length (Length), and an RFU field. The length field of the header may indicate the size of the payload.

In the case of an advertising channel PDU, one or more advertisement data structures (AD structures) may be included in the payload. Each AD structure may include an AD Length of 1 octet, an AD Type of 1 octet, and an AD Data field of a maximum size of 29 octets.

A data channel PDU may be used to transmit packets on a data physical channel (e.g., channel numbers 0-36). The data channel PDU may include a header with a size of 2 octets and a payload with a size of 0 to 251 octets. In this case, the header may include a Logical Link Identifier (LLID), Next Expected Sequence Number (NESN), Sequence Number (SN), More Data (MD), CTEInfo Present (CP), RFU, and Length fields. The data channel PDU may further include a Message Integrity Check (MIC) field, for example, the MIC field may be included in the case of an encrypted link layer connection in which the payload field size is not 0. The length field of the header may indicate the size of the payload, and if the MIC is included, it may indicate the length of the payload and the MIC.

FIG. 2C shows an example of an L2CAP PDU format, which may correspond to an example format of the payload field of FIG. 2B. The L2CAP PDU may include a length, a channel ID, and an information payload field. The length field may indicate the size of the information payload, and the information payload field may include higher layer data. The channel identifier field may indicate which upper layer data the information payload field includes. For example, if the value of the channel identifier field is 0x0004, ATT (ATTribute protocol), if 0x0006, may indicate SMP (Security Manager Protocol), or another channel identifier indicating another type of upper layer or middleware Values can be defined and used.

When the L2CAP packet of FIG. 2C is an L2CAP PDU (i.e., a control frame) transmitted on a signaling channel, the information payload field of FIG. 2C may be configured as shown in FIG. 2D. The information payload field may include a code, an identifier, a length and data fields. For example, the code field may indicate the type of the L2CAP signaling message. The identifier field may include a value that matches the request and the response. The length field may indicate the size of the data field. Data fields may contain attributes. The attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

FIG. 3 is a diagram for describing an example of a parameter used for updating a connection parameter to which the present disclosure is applicable.

FIG. 3A exemplarily shows the structure of a control data (CtrData) field included in an LL_CONNECTION_UPDATE_IND PDU. For example, the control data field may include a window size (WinSize), a window offset (WinOffset), an interval, a latency, a timeout, and an instant fields.

The WinSize field may be configured to indicate a transmitWindowSize value. The WinOffset field may be configured to indicate a transmit window offset (transmitWindowOffset) value. The Interval field may be configured to indicate a connection interval (connInterval) value. The Latency field may be configured to indicate a connection slave latency (connSlaveLatency) value. The Timeout field may be configured to indicate a connection supervision timeout (connSupervisionTimeout) value. The Instant field may be configured to indicate a predetermined reference instant.

FIG. 3B exemplarily shows the structure of the control data (CtrData) field included in the LL_CONNECTION_PARAM_REQ PDU. For example, the control data field may include a minimum interval (Interval_Min), a maximum interval (Interval_Max), latency (Latency), timeout (Timeout), preferred period (PreferredPeriodicity), reference connection event count (ReferenceConnEventCount), a plurality of offsets (Offset0)) and offset (Offset1, Offset2, Offset3, Offset4, Offset5) fields.

The Interval_Min field may be configured to indicate a minimum value of a connection interval (connInterval). The Interval_Max field may be configured to indicate the maximum value of connInterval. The Latency field may be configured to indicate a connection slave latency (connSlaveLatency) value. The Timeout field may be configured to indicate a connection supervision timeout (connSupervisionTimeout) value. The PreferredPeriodicity field may be configured to indicate a value of a multiple preferred for connInterval. The ReferenceConnEventCount field may be configured to indicate a connection event counter (connEventCounter) value for calculation of all valid Offset0 to Offset5 fields. Offset0, Offset1, Offset2, Offset3, Offset4, and Offset5 fields may be configured to indicate possible values of the anchor point position relative to ReferenceConnEventCount.

Figure 4A:
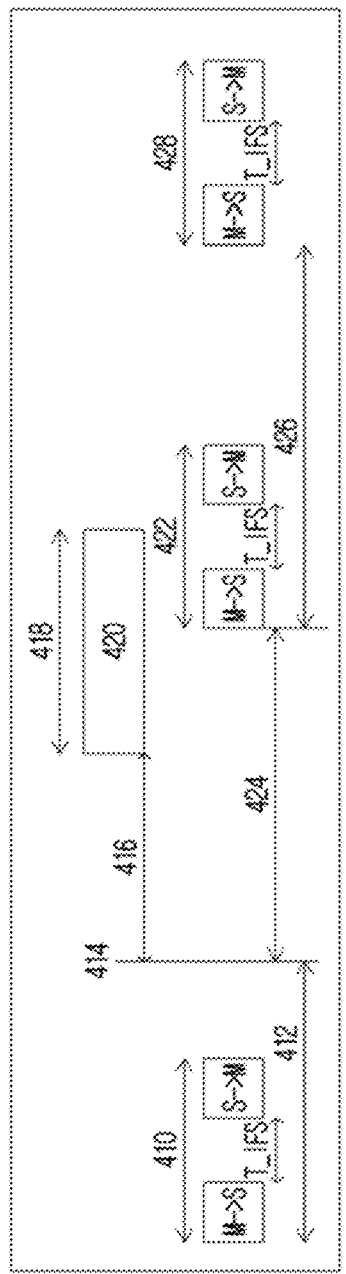
FIGS. 4A and 4B are diagrams illustrating examples of a connection parameter update procedure to which the present disclosure is applicable.
Figure 4B:
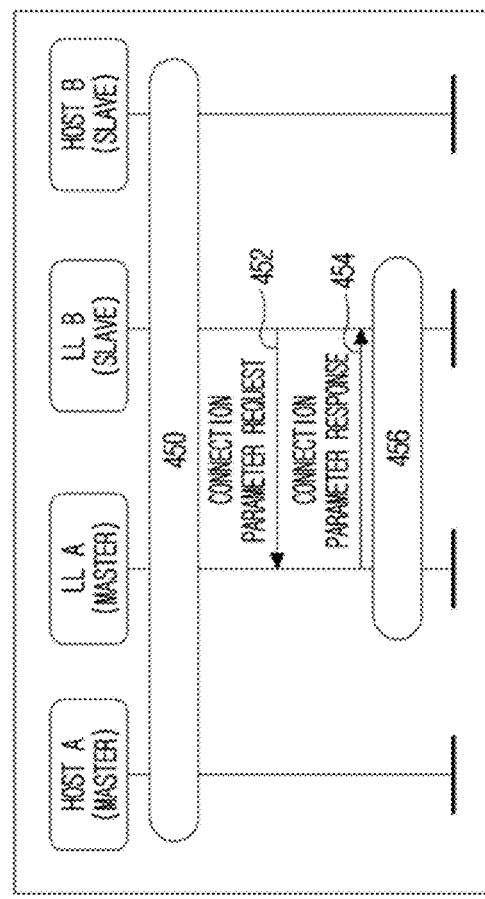

FIGS. 4A and 4B are diagrams illustrating examples of a connection parameter update procedure to which the present disclosure is applicable.

FIG. 4A illustrates a connection event timing when a connection parameter is updated based on parameters included in the CtrData field described in the example of FIGS. 3A and 3B.

The last event 410 transmitted based on the existing connection parameters may include transfer from master to slave(M->S), a time interval of T_IFS (inter frame space), and transfer from slave to master(S->M). In addition, an event may occur at every existing connection interval 412, a next event occurrence time after the last event occurrence may correspond to the instant 414, and a new connection parameter may be applied after the instant 414.

After the transfer window offset 416 with respect to the instant 414, the transfer window 420 may be configured according to the transfer window size 418. A first event 422 transmitted based on the new connection parameter within the transfer window may occur. The occurrence time of the first event is configured to a time point after t time 424 from the instant 414, and t may have a value greater than or equal to the transfer window offset and less than or equal to the sum of the transfer window offset and the transfer window size. Also, an event may occur at every new connection interval 426, and a second event 428 may occur after a new connection interval 426 after the first event occurs.

FIG. 4B shows an example of a connection parameter request procedure initiated by a slave.

For example, it indicates a case where the slave requests to change the anchor point and the master allows it. The link layer (LL B) of the slave wants to perform the anchor point movement, and the link layer (LL A) of the master may allow this (450).

A request message for changing a connection parameter may be transmitted from LL B to LL A (452), and in response, an instruction message for changing a connection parameter from LL A to LL B may be transmitted (454). Specifically, the connection parameter request procedure may be initiated by the slave issuing an LL_CONNECTION_PARAM_REQ PDU. This procedure may be initiated as a result of a connection update procedure initiated by the host, or may be initiated voluntarily by the LL (i.e., without a request by the host). For the LL_CONNECTION_PARAM_REQ PDU transmitted by the slave, the master may respond by using the LL_CONNECTION_UPDATE_IND PDU or the LL_REJECT_EXT_IND PDU.

Accordingly, the updated connection parameters may be used between LL A and LL B (456).

Hereinafter, a wireless power transfer system to which the present disclosure is applicable will be described.

A wireless power transfer (WPT) technology is a technology for wirelessly transferring electrical energy through various methods, and a wireless power transfer technology applied when the load is a battery can be called a wireless charging technology.

For wireless power transfer, various methods such as magnetic coupling, radio frequency, microwave, and ultrasound may be used. Among them, magnetic coupling-based wireless power transfer includes: a magnetic induction method using a magnetic induction phenomenon between the transmitting coil or primary coil of the power transmitting side and the receiving coil or secondary coil of the power receiving side, and a magnetic induction method using a magnetic induction phenomenon between the transmitting coil or primary coil of the power transmitting side and the receiving coil or secondary coil of the power receiving side. However, the wireless power transfer method to which the present disclosure is applicable is not limited to this example.

The wireless power transfer standard for the magnetic resonance method is led by Alliance for Wireless Power (A4WP), and the magnetic induction method is led by the Wireless Power Consortium (WPC).

The WPC is designed to transmit and receive various status information and commands related to the wireless power transfer system in-band. However, since in-band communication is not a system designed specifically for communication, it is not sufficient for faster information exchange and exchange of various information. Accordingly, an attempt is made to exchange information related to a wireless power transfer system in combination with another wireless communication system operating in an out-of-band (OOB). NFC and BLE technologies are being discussed as representative OOB technologies.

Qi is a magnetic induction wireless power transfer standard led by WPC. In Qi, various messages are defined so that the PTU and the PRU may exchange status information required to perform wireless power transfer. Before performing wireless power transfer in earnest, the PTU and the PRU exchange messages and share information for power transfer with each other. Qi provides an in-band channel for communication between PTU and PRU itself. However, since these in-band channels are not designed specifically for communication, they are not suitable for fast and reliable transmission of important information. Accordingly, a method of exchanging information related to wireless power transfer by using another wireless communication system as an OOB channel has been proposed. BLE is one of the representative OOB technologies for wireless power transfer, and has advantages such as a faster transfer speed compared to the existing in-band channel and a convenient data transmission method based on GATT.

Qi defines authentication information such as a certificate and a certificate chain for authentication between a PTU and a PRU, and the actual authentication procedure is also performed based on these information. For example, after a certificate exchange is first performed between an authentication initiator and a responder, a method in which the initiator authenticates the responder in a challenge/response method based on a public key specified in the certificate may be applied. The authentication between the PTU and the PRU is an essential procedure for safe wireless power transfer. Therefore, OOB also needs to support it.

However, authentication defined in Qi is done through separately defined Authentication Request/Response messages, but currently BLE does not have a protocol necessary to transmit these messages, so it is necessary to define a new protocol for exchanging Qi authentication information. In addition, considering that the default MTU (Maximum Transmission Unit) defined in the GATT protocol, which is most commonly used for information transfer in BLE, is 23 bytes, a new protocol needs to be defined to properly convey Qi authentication information, which may range from at least 34 bytes to over 200 bytes.

In addition, in the Qi authentication information exchange, a data communication channel for exchanging authentication data is defined (e.g., Auxiliary Data Transport (ADT), ADC (Auxiliary Data Control), etc.), and it is necessary to define a new protocol for supporting this in OOB (e.g., BLE).

The present disclosure includes an example in which a device of a wireless power transfer system detects a change in impedance, and changes a BLE operation based on this. For example, it may include a method of precisely measuring whether the power receiving side (PRx) moves by changing parameters related to BLE connection and advertising when a change in impedance is detected.

In addition, the present disclosure includes an example supporting wireless power transfer service quick discovery (WPT Service quick discovery). For example, it may include a method of defining a service related to wireless power transfer and rapidly searching and discovering a function or capability indicated by a characteristic included in the corresponding service.

Figure 5:
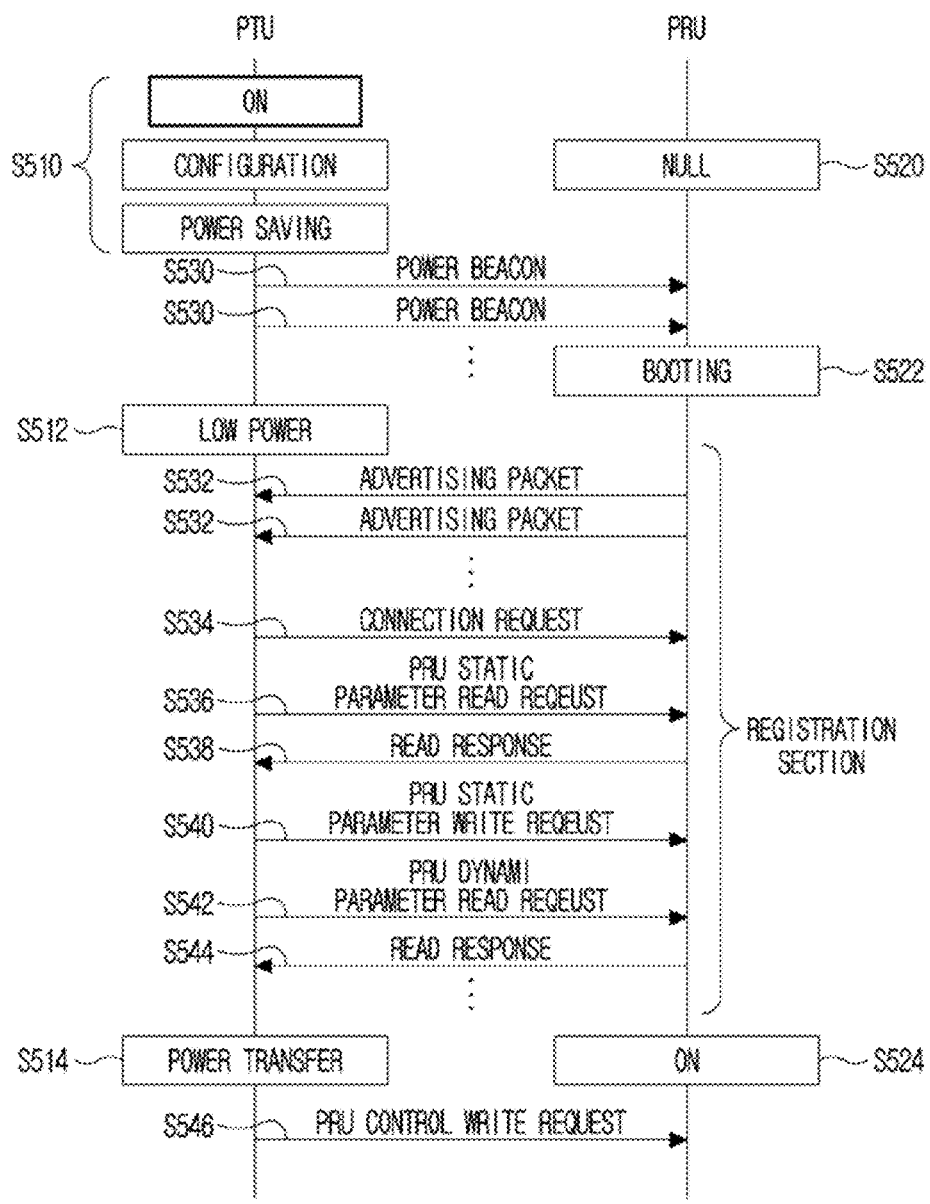
FIG. 5 shows an example of wireless power transfer information exchange to which the present disclosure is applicable.

FIG. 5 shows an example of wireless power transfer information exchange to which the present disclosure is applicable.

The example of FIG. 5 may be applied to both In-Band or OOB information exchange.

When the PTU is powered on, it may enter a power-save state through a configuration state that is an initialization step (S510).

The PTU may transmit a power beacon in a power-save state (S530).

The PRU may be in a null state until it receives a power beacon from the PTU (S520). Upon detecting a power beacon from the PTU, the PRU may transmit an advertising packet to the PTU through a booting step (S522) (S532). The PTU may receive an advertising packet from the PRU in a low power state (S512).

Upon receiving the BLE advertising packet from the PRU, the PTU may start establishing a BLE connection by transmitting a connect request to the PRU (S534).

When BLE communication is enabled, the PTU may transmit a read request message to the PRU (S536). The read request message may include information for requesting static parameters of the PRU. In response, the PRU may transmit a read response message including the PRU static parameters including its state information to the PTU (S538).

The PTU may transmit a write request message including PTU static parameter information including its capability information to the PRU (S540).

After the PTU and the PRU mutually exchange static parameter information, the PTU may transmit a read request message requesting a dynamic parameter of the PRU to the PRU (S542). In response, the PRU may transmit a read response message including its own dynamic parameter information (e.g., voltage, current, temperature, etc.) to the PTU (S544). Dynamic parameter information may be periodically transmitted from the PRU to the PTU. For example, the PTU may periodically send a read request and receive a read response thereto, or the PRU may request that the PRU send a read response whenever the dynamic parameter state of the PRU is changed while the PTU sends a single read request.

As described above, the process of S532 to S544 may be referred to as a registration section. After registration is completed, the PTU may initiate power transfer (S514), and the PRU may receive power transmitted from the PTU (S524).

When the PTU informs the PRU that charging will start or controls the PRU's permission, the PTU may control the PRU using a write request message (S546).

Figure 6:
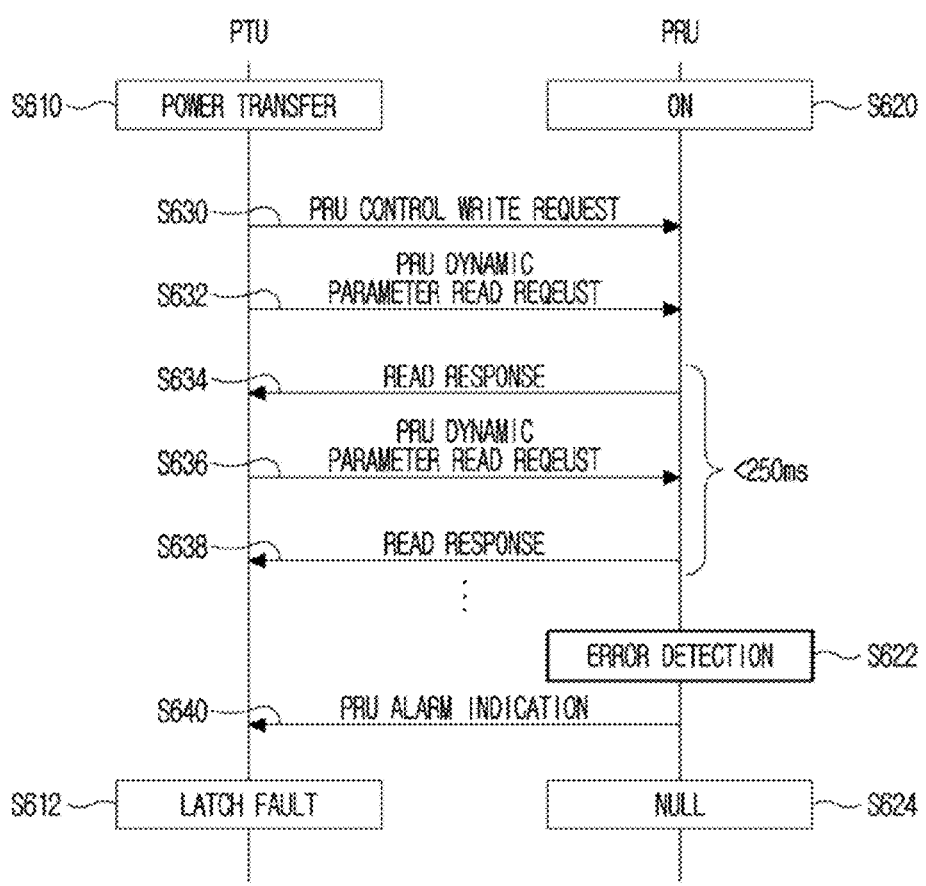
FIG. 6 shows an additional example of wireless power transfer information exchange to which the present disclosure is applicable.

FIG. 6 shows an additional example of wireless power transfer information exchange to which the present disclosure is applicable.

After the power transfer from the PTU to the PRU (S610) and power reception of the PRU (S620) are started, the PTU may transmit a write request message for PRU control (S630).

Thereafter, the PTU may transmit a dynamic parameter read request message to the PRU (S632) and receive a read response message thereto (S634). The read request/response process of the PRU dynamic parameter may be repeated (S636 and S638). This process may be triggered based on a predetermined event or may be performed in a periodic manner. For example, the interval between read response messages may be set to 250 ms or less.

When the PRU detects an error (S622), it may transmit an indication message including information indicating this to the PTU (S640). For example, information notifying an error may be configured in the form of a PRU alert (Alert), and the content may be OVP (Over Voltage Protection).

When the PTU receives the indication message including the PRU Alert, it may be in a latch fault state (S612). Also, the PRU in which an error has occurred may be in a null state (S624).

Figure 7:
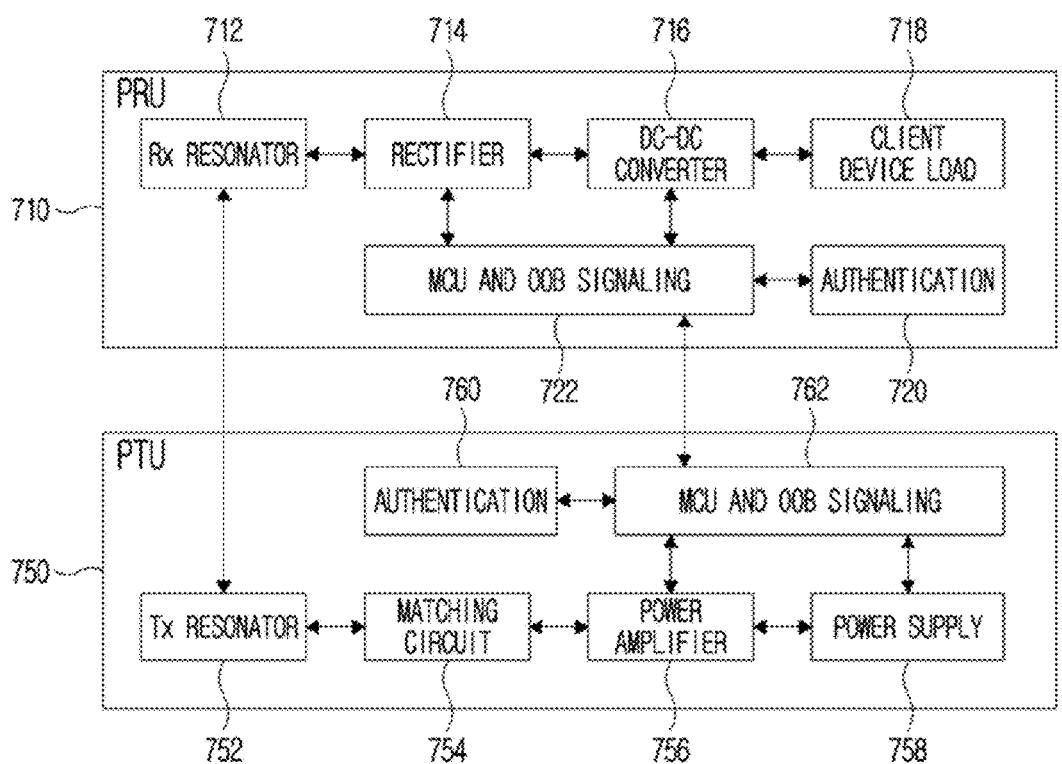
FIG. 7 is a diagram exemplarily illustrating the structure of a PRU and a PTU to which the present disclosure may be applied.

FIG. 7 is a diagram exemplarily illustrating the structure of a PRU and a PTU to which the present disclosure may be applied.

PRU 710 may include Rx resonator 712, rectifier 714, DC-DC converter 716, client device load 718, authentication module 720, main controller unit (MCU) and OOB signaling module (722), etc.

The Rx resonator 712 may select a specific frequency in the signal. The rectifier 714 may rectify the coil voltage and transmit it to the power amplifier while maintaining it at an appropriate voltage. The DC-DC converter 716 may convert a voltage rectified by a rectifier (full bridge) into a target voltage output. The client device load 718 may deliver the charging power of the load required by the client device. The authentication module 720 may perform authentication between the PRU and the PTU. The MCU and the OOB signaling module 722 may support low-power wireless communication (e.g., BLE), and may support searching for another device to be connected or transmitting data.

The PTU 750 may include transmission resonator (Tx resonator) 752, matching circuit 754, power amplifier 756, power supply 758, authentication module 760, MCU and OOB signaling module 762 etc.

Tx resonator 752 may generate a waveform of a specific frequency. The matching circuit 754 may receive a pulse width modulation (PWM) signal from the MCU and transmit the signal to the inverter to drive it. The inverter may correspond to an inverter for power conversion per coil, and may include, for example, four inverters, and may use two 4-channel logic switches to transmit a signal to the inverter. The power amplifier 756 may receive data from the MCU, and control a voltage corresponding to the DC-DC converter as a driving voltage input to the inverter. The power supply 758 may receive external power and internal power under the control of the MCU to supply power required for operation of each component. The authentication module 760 may perform authentication between the PRU and the PTU. The MCU and the OOB signaling module 762 may support low-power wireless communication (e.g., BLE), and may support searching for another device to be connected or transmitting data.

Hereinafter, an operation related to a power sharing mode will be described.

Table 1 shows examples of the meaning according to the bit value of the permission, and Table 2 shows examples of parameters included in the adjust power capability of PRU information and the meaning of their values, and Table 3 shows examples of parameters included in an adjust power response of a PRU Alert.

TABLE 1

| Value (Bit) | Description |
| --- | --- |
| 0000 0000 | Permitted without reason |
| 0000 0001 | Permitted with waiting time due to limited available power |
| 1000 0000 | Denied due to cross connection. |
| 1000 0001 | Denied due to limited available power |
| 1000 0010 | Denied due to limited PTU Number of Devices |
| 1000 0011 | Denied due to limited PTU Class support |
| 1000 0100 | Denied due to high temperature at PTU |
| All other values | RFU |

TABLE 2

| 7 | 6 | 5 | 4 | 3 | 2 | 1 | 0 |
| --- | --- | --- | --- | --- | --- | --- | --- |
| NFC receiver | Seperate BTLE radio in PRU | Power Control Algorithm Preference | Adjust power capability | Charge Complete Connected Mode | PTU Test Mode | RFU | RFU |
| 0 = Not supported | 0 = Not supported | 0 = $V_{RECT\_MIN\_ERROR}$ | 0 = Not supported | 0 = Not supported | 1 = Yes | | |
| 1 = Supported | 1 = Supported | 1 = Max | 1 = Supported | 1 = Supported | 0 = No | | |

TABLE 3

| 7 | 6 | 5 | 4 | 3 | 2 | 1 | 0 |
| --- | --- | --- | --- | --- | --- | --- | --- |
| Over-voltage | Over-current | Over-temp | PRU Self Protection | Charge Complete | Wired Charger Detect | PRU Charge Port | Adjust power response |

Power sharing mode may be applied when the PTU does not have enough power to supply P_RECT_MAX to all devices that require power, and a PTU may allow power allocation for multiple devices. The PTU must support power sharing mode.

When the PRU initiating new power transfer completes device registration with the PTU, before the PTU transmits a control characteristic for power transfer to the PRU, it may adjust the power transfer amount for the existing PRUs that are currently receiving power from the PTU (so that the new PRU may draw power).

When power adjustment is required, the PTU may configure the control characteristic to '0000 0001' and send it to the new PRU. In addition, a power control characteristic command for power adjustment may be transmitted to all PRUs currently receiving power.

If the PTU cannot support the P_RECT_MAX request of the new device, and the new PRU supports power adjustment, the power adjustment command reduces the PRECT to a range that the PTU can support, and the PTU may send an appropriate power adjustment command. The PTU may wait for 'Adjust power response' in the PRU dynamic parameter from the new PRU. The new PRU may adjust the power as requested by the PTU, and configure the 'Adjust power response' bit to '1'. When the PTU receives the 'Adjust power response', the PTU may configure and send a PRU control characteristic permission to '0000 0000' to the new PRU and start power transfer.

Examples described with reference to FIGS. 5 to 7 are applicable to a device conforming to the A4WP, but is not necessarily limited thereto and is applicable to various wireless power transfer devices.

Figure 8:
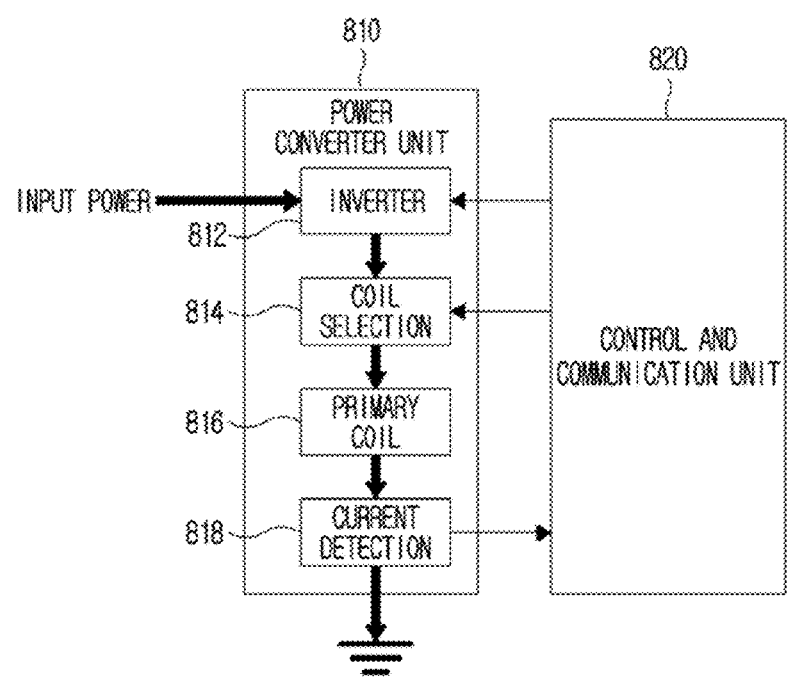
FIG. 8 is a diagram for describing the structure of a device to which the present disclosure is applicable.

FIG. 8 is a diagram for describing the structure of a device to which the present disclosure is applicable.

A power conversion unit 810 may send and receive signals to and from a control and communications unit 820.

When input power is applied to the power conversion unit 810, the inverter 812 may convert the DC input into an AC waveform that drives a resonant circuit composed of the primary coil 816 and a series capacitor. The coil selection module 814 may control power transfer by connecting the appropriate primary coil, executing the relevant power control algorithms and protocols, and driving the input voltage of the AC waveform. The operation of the inverter 812 and the coil selection module 816 may be performed based on information or commands from the control and communication unit 820. The primary coil 816 may convert current into magnetic flux. The current sensing module 818 may transmit the sensed current value to the control and communication unit 820.

The primary coil of the power transfer side may be designed according to a predetermined method. For example, according to the reference design, Type A (A1 to A33) and Type B (B1 to B6) for the Base Power Profile are presented, and also for the Extended Power Profile MP-A1 to MP-A4 may be presented.

Figure 9:
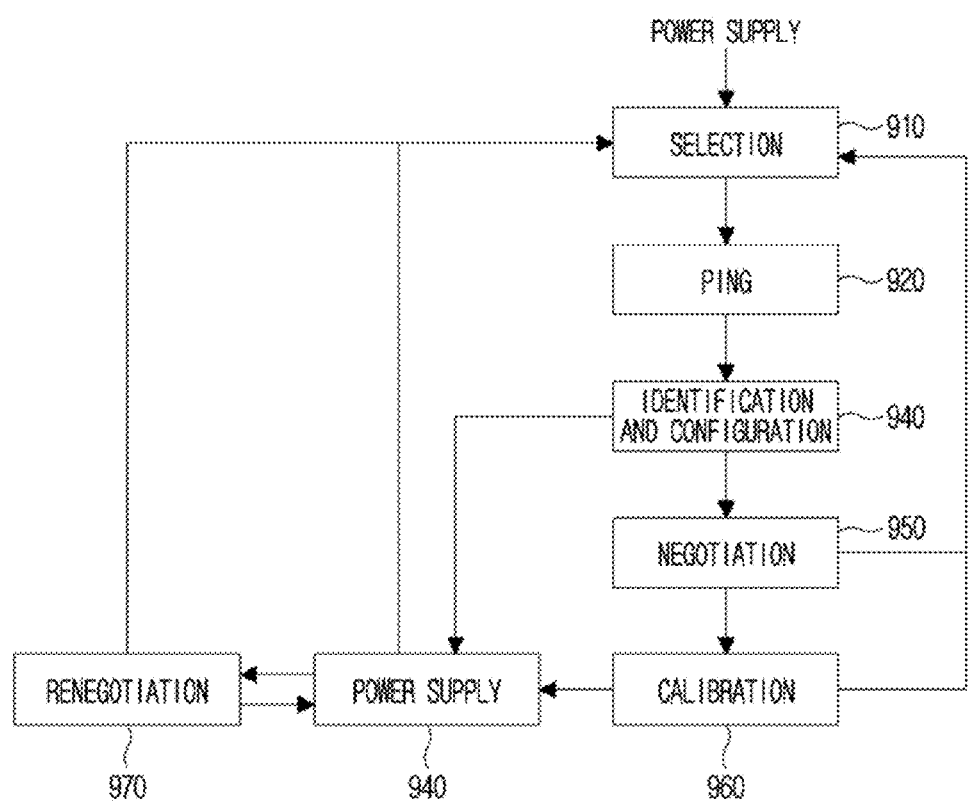
FIG. 9 shows an example of a state transition diagram of a device of a wireless power transfer system to which the present disclosure is applicable.

FIG. 9 shows an example of a state transition diagram of a device of a wireless power transfer system to which the present disclosure is applicable.

When power is supplied to the power transmission side (PTx), a selection state is entered 910.

As the object is detected, it may move to a ping state (920). Object sensing or detection may be, for example, sensing that a powered receiving (PR) device is placed on a powered transmitting device (e.g., a pad).

When the PTx normally receives a signal strength packet transmitted by the power receiving side (PRx), it may enter an identification & configuration state (930). In this state, the PTx may receive a configuration packet from the PRx, identify parameters necessary to perform wireless power transfer and communication, and generate a power transfer contract. For example, the PTx may generate an initial power transfer contract, based on guaranteed Power, maximum Power, received power packet format, frequency shift keying (FSK) polarity/modulation depth information, etc. through configuration packet. Based on the generated power transfer contract, the PTx and the PRx may perform wireless power transfer in a power transfer state.

In the identification and configuration state, the PTx may receive an identification packet from the PRx, if the PTx supports the identification packet, it may send an ACK or NACK to the PRx in response, and if the identification packet is not supported, a Not-Defined (ND) message may be sent to the PRx. The PTx may transition to a power transfer state when the PRx supports wireless power transfer based on the value of the identifier field of the identification packet and the identifier value is verified (940).

When a foreign object detection (FOD) extension function is supported, the PTx may transition to a negotiation state (950). In the negotiation state, it may perform fine-tuning of the power transfer contract between the PTx and the PRx. Specifically, the PRx transmits a negotiation request to the PTx, and the PTx may grant or deny this request. In order to improve the initial evaluation of the case when a foreign object exists, the PTx may compare the quality factor reported by the PRx with the result measured by the PTx itself, and in the case of foreign object detection (FOD), it may return a selection state.

When the PTx receives a specific request (SR) packet for negotiating a change in the power transfer contract transmitted by the PRx, the PTx may transition to a calibration state (960). PTx may improve the ability to detect foreign objects during power transfer and may adjust parameters related to power loss. In this regard, PRx may provide information on received power in different load conditions. It may also return to the selected state when it transitions to the power transfer state, or when calibration fails or an error occurs, based on SR packets, general request packets, FOD status packets, proprietary packets, reserved packets, etc. in the remediation state.

Meanwhile, in order to adjust the power transfer contract in the power transfer state, it may transition to a renegotiation state initiated by the PRx (970). When the renegotiation is completed, it may transition back to the power transfer state.

When the PTx transmits a control error packet, received power, charge status, and end power transfer from the PRx, the PTx may transition back to the selection state.

In addition, in transitioning from the negotiation 950, renegotiation 970 and/or remediation 960 states to the power transfer 940 state, OOB (e.g., BLE) connection may be established and authentication may be performed based on OOB. For example, power transfer may be performed through power control, FOD, and authentication only through BLE in the negotiation state. Alternatively, power control, FOD, and authentication may be performed through BLE in a negotiation state, and coil and PRx detection may be performed in-band to perform power transfer. Alternatively, in the negotiation state, power control and FOD are performed in-band, and some other information may be authenticated through BLE. Alternatively, power control, FOD (and authentication) may be performed only in-band.

Figure 10:
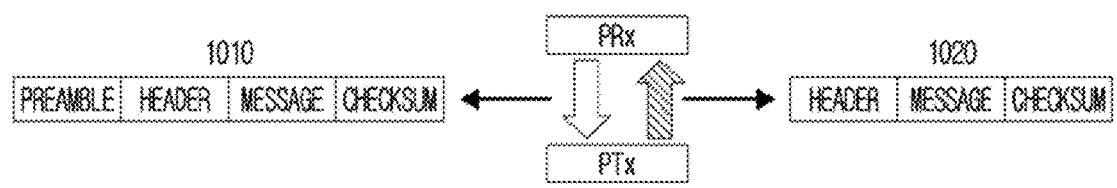
FIG. 10 shows an example of an in-band communication interface of a wireless power transfer system to which the present disclosure is applicable.

FIG. 10 shows an example of an in-band communication interface of a wireless power transfer system to which the present disclosure is applicable.

A packet transmitted from the PRx to the PTx may be configured using an amplitude modulation method of a power signal (1010). Such a packet structure may include a preamble, a header, a message, and a checksum.

The header includes a packet type, and the type and content of the corresponding message are as follows.

Signal Strength: The degree of coupling between the primary and secondary coils

End Power Transfer: including the reason for the interruption (e.g., over voltage, over temperature, etc.)

Power Control Hold-off: the amount of time the PTx must wait (e.g. in ms)

Configuration: Power Class, Maximum Power Value, etc. (See Table 4)

In addition, identification, extended identification, general request, specific request, foreign object detection Status (FOD), control error, charge status(e.g., 0-100%), renegotiate, receive power (e.g., it may be defined as 24-bit size or 8-bit size), proprietary information, etc. may be included.

Table 4 shows an exemplary structure of a message of a configuration packet.

TABLE 4

| | b7 | b6 | b5 | b4 | b3 | b2 | b1 | b0 |
|---|---|---|---|---|---|---|---|---|
| $B_0$ | Power Class | | | | Maximum Power Value | | | |
| $B_1$ | | | | Reserved | | | | |
| $B_2$ | Prop | Reserved | | | ZERO | | Count | |
| $B_3$ | Window Size | | | | Window Offset | | | |
| $B_4$ | Neg* | Polarity* | Depth* | | Reserved | | | |

Next, a packet transmitted from the PTx to the PRx may be configured in a frequency shift keying method (1020). This packet structure may include a header, a message, and a checksum.

The header includes the packet type, and the types and corresponding message contents may include power transmitter data not available, power transmitter identification (Version), power transmitter capability (proprietary) and the like. Power transmitter capabilities may include guaranteed power (e.g., the amount of output power of an appropriate reference power receiver that the power transmitter is certain to be available at any point during the power transfer phase) and potential power (e.g., amount of output power by an appropriate reference power receiver that the power transmitter may make available during the power transfer phase).

Additionally, for OOB (e.g. BLE) connection, at the configuration stage and/or negotiation stage, information such as OOB flag in PRx's setup packet (that is, notify PTx of whether PRx supports OOB), OOB flag in PTx's capability packet (that is, notifies PRx of whether PTx supports OOB), OOB address of PRx (i.e., notifying PTx of OOB address of PRx through in-band), OOB address of PTx (that is, notify PRx of OOB address of PTx through in-band), and SRQ/communication packets (i.e., PTx and PRx decide whether to communicate with each other OOB and/or in-band) and the like may be exchanged.

Next, an additional example of the power sharing mode will be described.

In shared mode, the PTx may determine the total magnetic force that can be shared among all the PRx it is servicing. Here, PTx may allow the current passing through the primary coil to be maintained at a constant level. The PRx may change the amount of power it will receive from the magnetic field by adjusting the appropriate impedance. If the PRx cannot adjust the impedance, the PRx may offer to the PTx to increase or decrease the amount of power that the PRx can use. For this, a communication protocol mechanism for synchronizing PTx and PRx may be provided in the proposal of PRx.

In the Exclusive Mode, the power transmitter may provide only one power receiver at a time. For power transmitter products (PTP) and power receiver products (PRP), after the power transfer from the PTP to the first PRP is complete (for example, after the PRP's battery is fully charged), user may manually change to the next PRP. To provide a better user experience, PTP may support multiple PRPs or implement a mechanism to automatically select the next PRP. For example, it may select one of the arrangement of a plurality of primary coils, or to physically move the primary coil from one PRP to the next PRP. Alternatively, a PTP may include multiple PTx implementations, with each PTx acting as a single PTP while simultaneously transferring power to multiple PRPs.

In the shared mode, the power transmitter may support multiple power receivers at the same time, but this is only possible when all of the PRx support the shared mode. In the case of PTP and PRP, this means that the user may place multiple shared mode PRPs on the surface of shared mode PTPs at the same time. Therefore, a user may charge a plurality of PRPs without replacing them to complete charging (however, there is a limit to the number of PRPs that a PTP can process at the same time).

However, if the PTP contains only one PTx and the user places a mix of shared and exclusive mode PRPs on the surface of the PTP, the PTP may need to power the PRP in a sequential mode of operation. Depending on the configuration of the PTx, the user may need to rearrange the PRP for power transfer. For example, if the PTx uses a single primary coil, the user may have to manually replace each PRP after power transfer is complete. Alternatively, if the PTx uses a Primary Coil arrangement, it may automatically select an appropriately placed coil to service the next PRP. That is, the PTP may first service all the shared mode PRPs at the same time, and then sequentially charge the remaining exclusive mode PRPs.

Figure 11:
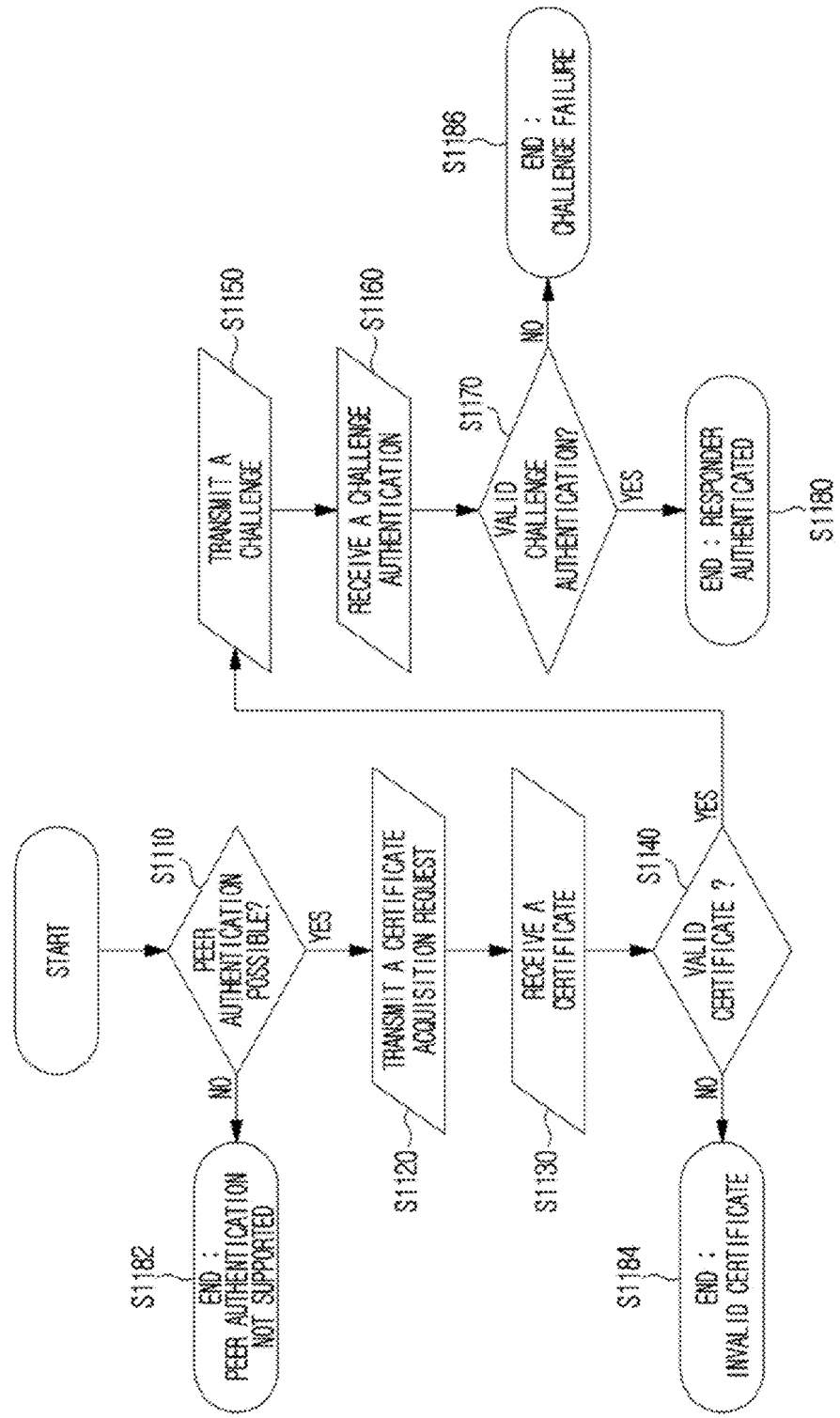
FIG. 11 is a diagram exemplarily illustrating an authentication process in a wireless power transfer system to which the present disclosure is applicable.

FIG. 11 is a diagram exemplarily illustrating an authentication process in a wireless transfer power system to which the present disclosure is applicable.

FIG. 11 illustrates a process in which an authentication initiator device authenticates an authentication responder device.

The initiator may check whether a peer device can perform authentication (S1110).

That is, it may determine whether the peer device can be a responder. If the peer device does not support authentication, the procedure may end (S1182). If the peer device supports authentication, the initiator may transmit a certificate acquisition request (GET CERTIFICATE) message in slot 0 to the responder (S1120), and receive a CERTIFICATE message from the responder (S1130).

Next, the initiator may verify the validity of a certificate received from the responder (S1140). For example, it may be determined whether a certificate chain associated with a received certificate is validly signed. In the case of an invalid certificate, the procedure may be terminated (S1184). In the case of a valid certificate, the initiator may transmit a CHALLENGE to the responder in slot 0 (S1150) and receive a challenge authentication (CHALLANGE_AUTH) from the responder (S1160). In this case, the responder may transmit CHALLANGE_AUTH signed with its private key to the initiator.

Next, the initiator may determine whether the CHALLANGE_AUTH received from the responder is valid (S1170). For example, the initiator may verify that the challenge signature received from the responder is valid. In the case of an invalid signature, the challenge may be processed as failed and authentication for the responder may also be processed as failed (S1186).

In the case of a valid signature, authentication of the responder may be completed (S1180).

The above-described examples described with reference to FIGS. 8 to 11 are applicable to, but not necessarily limited to, devices compliant with WPC, and are applicable to various wireless power transfer devices.

Hereinafter, examples of a new protocol for transmitting and receiving information related to wireless power transfer according to the present disclosure will be described. The following examples may be applied to various wireless power transfer technologies that are not limited to A4WP, WPC, etc., and may be applied to various wireless communication technologies that are not limited to BLE, etc. that support OOB communication of a wireless power transfer system.

Figure 12A:
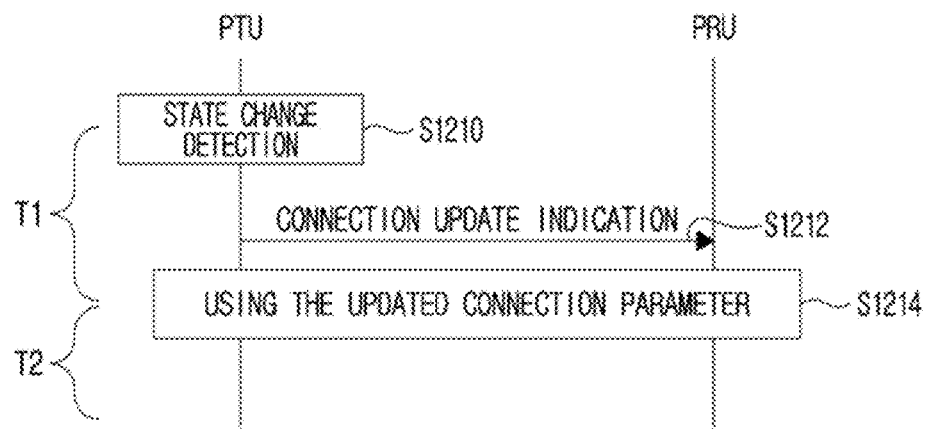
FIGS. 12A and 12B are views for describing a wireless communication connection method according to a state change to which the present disclosure is applicable.
Figure 12B:
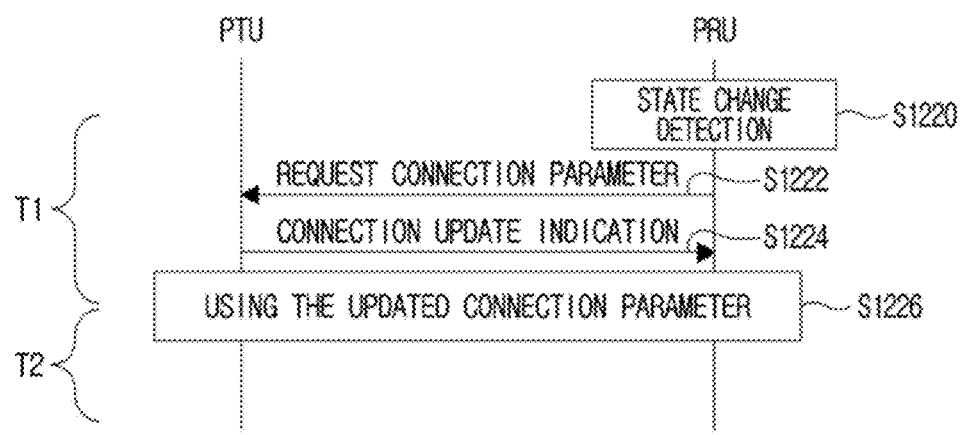

FIGS. 12A and 12B are diagrams for describing a wireless communication connection method according to a state change to which the present disclosure is applicable.

In the wireless power transfer operation, it may be required to quickly change the configuration between the PTU and the PRU according to an external situation change such as a user suddenly changing the location of the PRU. In order to quickly respond to such a situation, a method of detecting whether a wireless communication connection configuration change is necessary and quickly changing the connection configuration accordingly will be described.

FIG. 12A is a case in which the PTU detects a state change, and FIG. 12B is a case in which the PRU detects a state change. For example, criteria such as a predetermined maximum/minimum threshold or range for a state to be detected are preconfigured, and the PTU or PRU may check the status value periodically or on an event-based basis, and it may be determined that the state change has occurred when the checked state value deviates from the criteria.

In the example of FIG. 12A, the state change detection of the PTU (S1210) may include the PTU detecting a magnetic field change, an impedance change, a temperature change of the PRU, a temperature change of the PTU, a foreign object detection (FOD), an illegal data packet, and the like. In addition, detecting the state change by the PTU may further include detecting that the efficiency of power transfer is decreasing by the PTU.

If the PTU detects a state change, the PTU may transmit a connection update indication to the PRU (S1212). For example, the connection update indication may be the LL_CONNECTION_UPDATE_IND message described with reference to FIGS. 3A, 3B, 4A and 4B. Accordingly, the connection parameter between the PTU and the PRU may be updated, and the connection between the PTU and the PRU may be re-established, resumed, or maintained using the updated parameter (S1214).

In the example of FIG. 12B, the state change detection of the PRU (S1220) may include the PRU detecting a magnetic field change, an impedance change, a temperature change of the PRU, a temperature change of the PTU, an FOD, an illegal data packet, and the like. In addition, the case where the PRU detects a state change may further include a case in which the PRU detects that the relative position with the PTU (e.g., the distance from the PTU, the position from the reference point of the PTU) is changed and a case in which the PRU detects that its own location is changed (e.g., a change in a detection value of a sensor (e.g., a gyro sensor) of the PRU). In addition, the case in which the PRU detects a state change may further include a case where the PRU needs more power than before and a case where the application of the PRU has a request (e.g., when the PRU uses an audio service during wireless charging, an update of connection parameters may be required in order for the wireless charging service and the audio service to operate smoothly at the same time).

If the PRU detects a state change, the PRU may transmit a connection parameter request message to the PTU (S1222). For example, the connection parameter request message may be the LL_CONNECTION_PARAM_REQ message in the examples of FIGS. 3A, 3B, 4A and 4B. In response, the PRU may receive a connection update indication message from the PTU (S1224). For example, the connection update indication message may be the LL_CONNECTION_UPDATE_IND message described with reference to FIGS. 3A, 3B, 4A and 4B. Accordingly, the connection parameter between the PTU and the PRU may be updated, and the connection between the PTU and the PRU may be re-established, resumed, or maintained using the updated parameter (S1226).

In the above-described examples, a predetermined timer (e.g., T1) may be applied from the time of detecting a state change of the PTU or PRU to the time of establishing a connection using the updated parameter. That is, it is required to complete the connection parameter update after the state change is detected within a predetermined timer, so that the parameter update may be quickly performed adaptively to the changed situation. If the update of the connection parameter is not completed before the predetermined timer expires, the PTU or PRU may stop transmitting or receiving power, or perform the connection update process again while transmitting or receiving only a minimum amount of power.

In addition, after the connection parameter update triggered by the PTU or PRU, the PTU or PRU may measure the status for a predetermined timer (e.g., T2). This is because the changed state may remain as it is, may lead to an additional state change, or the state change may be temporary. If the changed state is maintained for a predetermined timer, the connection based on the updated parameter may be maintained. If a state change additionally occurs within a predetermined timer, a connection parameter update process triggered by the PTU or PRU according to the additionally changed state may be additionally performed. If the state returns to the previous normal state within a predetermined timer, the connection may be re-established, resumed, or maintained by changing to a basic connection parameter through a connection parameter update process triggered by the PTU or PRU.

As an additional example, in the existing BLE, connection-related parameters such as connection interval and slave latency may be configured when establishing a connection and used in communication in a connected state. In order to update a connection parameter during communication, a connection update procedure may be performed to change the connection parameter. In the connection update process, in order to apply the new connection parameter, Tx and Rx must reconfigure the anchor point related to when to apply the newly updated connection parameter, etc. and it is necessary for the Tx and the Rx to check whether the new connection parameter is actually ready to be applied between the Tx and the Rx. Because it takes a long time, it is not suitable for application to a wireless charging system. Therefore, the connection update may be performed quickly based on the information already exchanged between the Tx and the Rx, without the need to reconfigure the anchor point using a sub-rating parameter (e.g., connection parameter update information exchanged in advance between Tx and Rx may be exchanged, application time).

In addition, while performing communication using the connection parameters initially set between the PTU and the PRU, when the situation changes, such as when the user moves the PRU, the PTU and the PRU may need to exchange information within a short latency by changing the connection parameters. In this case, it is possible to change parameters by performing the existing connection update procedure, but since the parameter change time required by the wireless charging system requires more urgency, there is a need to use an enhanced connection update. Unlike the existing method, the improved connection update procedure may change connection parameters while minimizing the configuration of a new anchor point and addition of a new link layer message by exchanging sub-rate values in advance.

Since the improved connection update process can reduce the time required to change the connection interval, it may be usefully applied to applications using dynamic bandwidth requirements required to transmit data with low power and low latency.

Here, the sub-rate means a factor applied to the current connection interval, and the sub-rate may correspond to a lower rate than a general rate. That is, in a sub-rate connection, an interval that is longer than a general connection interval may be applied. The slave latency may indicate a value to be used for a new connection after change. For example, in a sub-rate connection, a slave may be available at a time point (e.g., in ms) of 'connection interval*sub-rate*(latency+1)'.

Figure 13A:
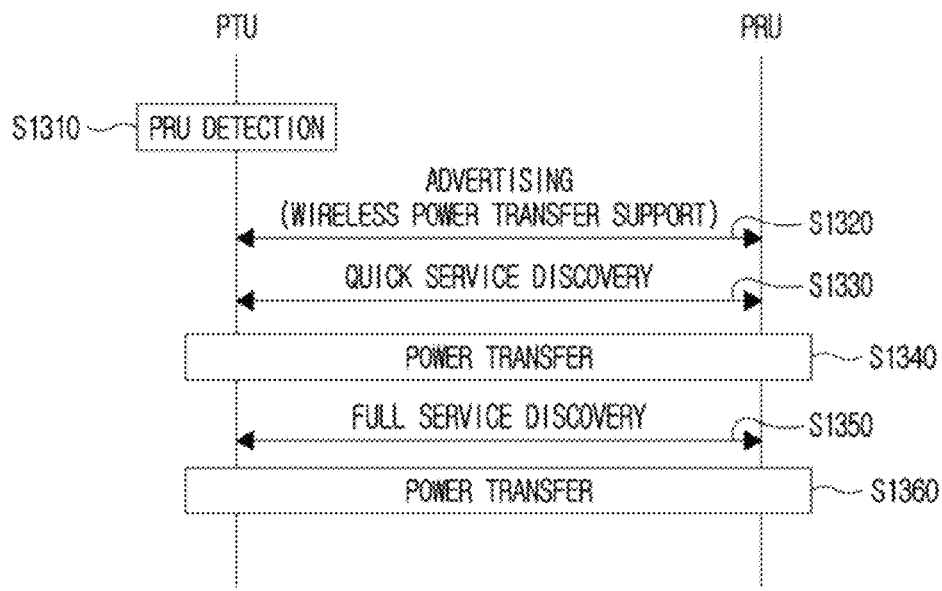
FIGS. 13A and 13B are diagrams for describing a quick service discovery method to which the present disclosure is applicable.
Figure 13B:
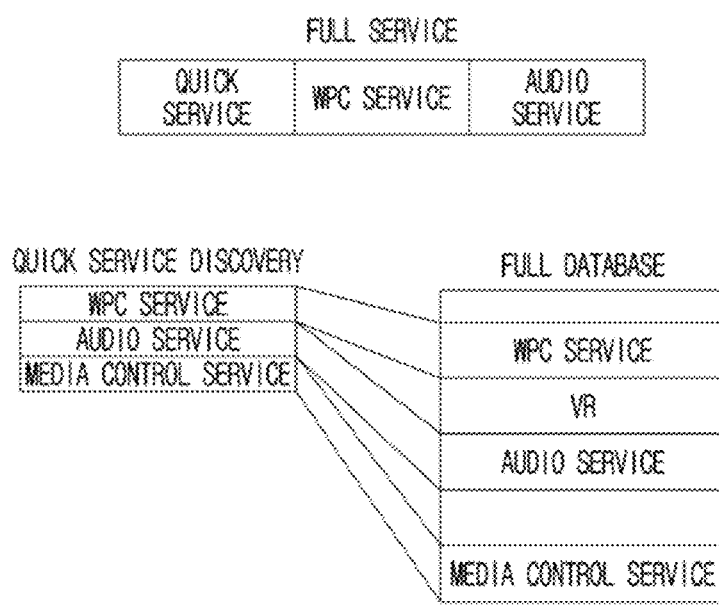

FIGS. 13A and 13B are diagrams for describing a quick service discovery method to which the present disclosure is applicable.

When the PTU detects the PRU(S1310) in FIG. 13A, it may be checked whether the PRU supports a specific wireless power transfer technique (e.g., WPC) through an advertising procedure (S1320). For example, sensing the PRU by the PTU may include sensing that the PRU is located in proximity to the PTU, sensing an impedance change, and the like.

If it is checked that the PRU supports the wireless power transfer scheme, the PTU may perform a quick service discovery procedure (S1330) and then start a power transfer operation (S1340).

The quick service discovery procedure may include checking only a part of the entire profile, service, and characteristics supported by the PRU, rather than checking all of them.

After power transfer is started, the PTU may perform a full service discovery procedure for the PRU (S1350), and may reconfigure, resume, or maintain the power transfer operation accordingly (S1360).

The full service discovery procedure refers to a procedure of checking at least one of the entire profiles, services, and characteristics supported by the PRU, excluding or including at least one of some profiles, services, or characteristics identified through the quick service discovery procedure.

As shown in FIG. 13B, for example, the total service supported by the PRU may include various services such as a WPC service, an audio service, a media control service, and a VR service. For various services, profiles or characteristics, a service UUID (e.g., 16-bit service UUID), a starting handle, an ending handle, service-specific data, and the like may be defined.

The quick service discovery procedure may include first identifying only the WPC service, the audio service, and the media control service, which are a part of the entire service. For example, the WPC service means a BLE service/profile for the wireless power transfer system protocol operation, and audio service includes all BR/EDR, LE audio services/profiles (i.e. audio services/profiles defined so far as well as audio services/profiles to be defined in the future, e.g. advanced audio distribution profile (A2DP), media control service, hands-free profile (HFP), etc.).

In this regard, it is possible to configure the BLE GATT server so that the client can quickly discover and use only the main services (e.g., WPC service, audio service, media control service) among all the GATT services and characteristics of the server. Among the various services provided by the wireless power charging system, the WPC service is particularly important for quick search and use, so the server may configure the WPC service to enable quick service discovery. The client may quickly search for and use WPC services by requesting quick service discovery.

Through this process, as soon as the PTU detects the PRU, the power transfer operation is started as quickly as possible, after checking the full services supported by the PRU, an operation corresponding to an additional service supported by the PRU may be performed while reconfiguring or maintaining the power transfer operation in an appropriate manner. For example, when a PTU is disposed in a vehicle and a user carrying a PRU boards a vehicle, the power transfer operation is first initiated through the quick service discovery procedure, after identifying additional services (e.g., audio transmission, connection brokerage, etc.) supported by the PRU through the entire service discovery procedure, the corresponding additional service may be used.

For example, when the PTU performs an initial power transfer operation through quick service discovery for the PRU, while performing power transfer according to the power sharing mode, after the entire service discovery is completed, according to the enhanced attribute protocol (EATT) in consideration of the various services supported by the corresponding PRU, multiple services or services and/or profiles of multiple devices may be processed simultaneously.

In this regard, when the wireless power transfer (e.g., WPC) service is included in the target of quick service discovery, a wireless power transfer profile and a data field for the wireless power transfer service may be defined. For example, service contents supported in connection with wireless power transfer may include multi-charging (or shared mode charging), fast charging, etc., and a protocol for defining a field indicating this and transmitting a message including these fields may be defined. A wireless power transfer control point identified through quick service discovery may be used when exchanging power information to be negotiated between the PTU and the PRU.

For example, when configuring a characteristic for data exchange between a GATT client and a server, a characteristic called a control point (CP) may be configured. In the procedure in which the client instructs the server to perform specific information and the server performs an operation according to the corresponding information and responds, CP characteristics may be configured.

CP characteristics may be configured to enable writing, indication, and notification. The client may instruct the server to perform a specific operation through a write request, and the server may transmit the result to the client through an instruction or notification after performing the operation.

A client characteristic configuration descriptor (CCCD) may be configured for CP characteristics. CCCD may define how properties can be configured for a particular client. The CCCD value may be maintained during the connection between the bonded devices.

In addition, the existing BLE is designed to be suitable for managing a single GATT transaction. For example, when the client requests the server to write specific information to the write request requesting a response, the client cannot communicate with other servers until the server sends a response and the client receives it. However, when operating in a shared mode in a wireless charging system, there may be a case in which one PTx and a plurality of PRxs need to simultaneously operate a plurality of transactions. In this case, the existing BLE communication may be inappropriate.

EATT provides functions suitable for operation of a plurality of transactions, which may be suitable for operation in wireless charge sharing mode. Through this, the wireless charging system may provide efficient communication in a situation where a plurality of PRx are simultaneously charged based on EATT.

Additionally, a priority for one or more of a service, a profile, or a characteristic among the entire GATT database may be defined. For example, an audio service may have a low priority, and a WPC service may have a high priority. Alternatively, even within the WPC service, some characteristics may have high priority and other characteristics may have low priority.

For example, the PRx may notify the existence of one or more services and priority information for each service through the advertising packet. Through this, a request for omission of service discovery profile (SDP) may be possible. When it is accepted that the PTx first performs the discovery of a service/characteristic having a high priority of the PRx, the PTx and the PRx may directly exchange information on the corresponding service/characteristic through OOB. Meanwhile, with respect to a service/characteristic having a low priority, after confirming that the power transfer step has been entered for exchanging the corresponding service information, SDP may be performed through OOB.

FIG. 14 is a diagram for describing a location-based wireless power transfer method to which the present disclosure is applicable.

The PTU may support in-band wireless power transfer and communication and OOB communication (e.g., BLE-based communication). The PRU may also support in-band wireless power reception and communication and OOB communication (e.g., BLE-based communication). In the example of FIG. 14, although the PTU or PRU is functionally divided into a block in charge of in-band wireless power transfer/reception and communication and a block in charge of OOB communication, these may be implemented by being included in one PTU device or one PRU device.

The PTU may acquire location information from a nearby location information providing device in an OOB communication method (S1410). For example, the location information providing device may be a BLE beacon device that broadcasts location-related information, space identification information, state information, and the like.

Accordingly, the PTU OOB may check the location of the PTU (S1420). For example, when the PTU is a charging pad, a location or region (e.g., office, home vehicle, etc.) in which the charging pad is disposed may be identified.

The PTU OOB may inform the surrounding information about the location of the PTU (S1430). For example, the PTU may transmit information about the location to an external device (e.g., a BLE device, a Wi-Fi device, etc.).

The PTU may determine a service that can be provided on a location/region basis based on the location information on the PTU obtained through the PTU OOB (S1440).

The PTU may detect or sense a PRU adjacent to the in-band and perform a wireless power transfer operation to the PRU (S1450). The PTU may inform the PTU OOB of status information that wireless charging is currently in progress (S1460). For example, when the user places the PRU in the PTU for charging, status information indicating that wireless charging is in progress may be identified in the PTU. Accordingly, the PTU may determine that the location-based service for the PRU can be performed.

The PTU may perform a service according to the deployed location/region (S1470).

The PRU may determine whether to use the wireless charging service (S1480). For example, the PRU may determine whether to use a location-based service during wireless charging.

The PTU may provide the PRU with information necessary for performing the location service through OOB communication, and the PRU may exchange information necessary for performing the location service with an external device through OOB communication (S1490). Accordingly, the location-based service may be performed in the PTU, the PRU, and the external device.

In the above-described examples, the positioning or positioning protocol may follow the existing indoor positioning technology protocol. For example, a field related to wireless charging system installation may be added to an existing positioning protocol.

The PTU may perform a location-based service. As an example of the location-based service, it is possible to perform the location-based service by transferring the MAC address (e.g. BT, MAC address of Wi-Fi module, etc.) of the vehicle AVN(audio, video, navigation) device to the charged PRU to the device in which the PTU installed in the vehicle is charged. For example, if the user puts the smartphone (PRU) on the PTU installed in the vehicle and charges it, the user may listen to the music of the PRU (e.g., audio source) through the vehicle's AVN (e.g., audio sink) without special configuration.

As an additional example, the PTU installed in the airplane is capable of performing a location-based service that connects a charged device (e.g., a user's headset, mobile phone) and an IFE (in-flight entertainment system). Through this, users may listen to music provided by the IFE display (e.g., audio source) with their headset by placing their headset or phone on the PTU installed in the plane without special configuration or manipulations. In addition, if the smartphone is placed on the PTU for charging, it is possible to watch the smartphone's video on the IFE display through Wi-Fi mirroring.

The location-based service may have different services depending on where the PTU is installed. As a method of determining the place where the PTU is installed, the method configured by the developer or manufacturer during the installation process may be applied. A method of identifying a place where the PTU is installed by itself through communication may be applied.

In the latter case, a beacon capable of determining a location nearby informs the PTU of the location of the PTU, and the PTU may perform a location-based service suitable for the location. For example, information such as being installed on a specific subway station platform, installed in a specific user's living room, or installed on the second floor of a specific cafe may be identified through the beacon.

In the case of outdoors, the location may be determined through GPS. In the case of indoors, location may be determined using Wi-Fi and BLE positioning technology.

As in the example of FIG. 14, when information necessary for performing a location-based service is provided in wireless power transfer, an AVN may be assumed as an external device of the example of FIG. 14 in the same space as a vehicle. In this case, based on the identification information provided by the AVN, an audio transmission service between the AVN and the PRU may be performed.

Figure 15:
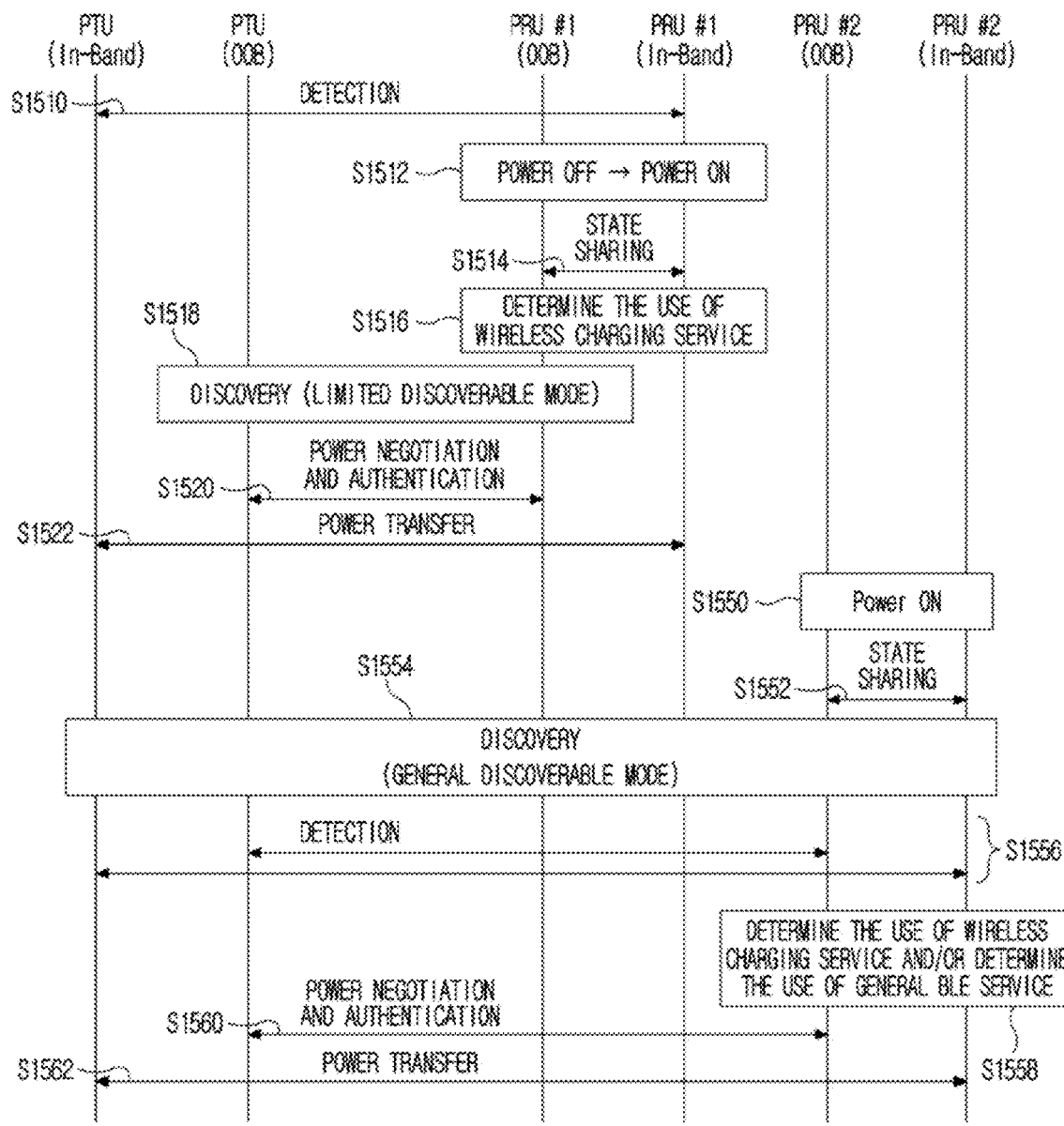
FIG. 15 is a diagram for describing an example of a limited discoverable mode to which the present disclosure is applicable.

FIG. 15 is a diagram for describing an example of a limited discoverable mode to which the present disclosure is applicable.

The PTU may support in-band wireless power transfer and communication and OOB communication (e.g., BLE-based communication). The PRU may also support in-band wireless power reception and communication and OOB communication (e.g., BLE-based communication). In the example of FIG. 15, although PTU or PRU is functionally divided into a block in charge of in-band wireless power transfer/reception and communication and a block in charge of OOB communication, these may be implemented by being included in one PTU device or one PRU device.

FIG. 15 discloses two PRU devices (PRU #1 and PRU #2), PRU #1 is an example of a device in a power-limited state, and PRU #2 is an example of a device in a state in which power is not limited.

The PTU may determine that the PRU #1 is close to the PTU through a detection process such as detecting magnetic field fluctuations (S1510). Thereafter, the PRU #1 may be changed from the power-off state to the power-on state to supply the minimum power to the functional module in the device (S1512). For example, PRU #1 may drive an operating system stack (OS stack) and supply power to an OOB module (e.g., BLE or NFC module). After power supply is started, the power supply state of the PRU #1 OOB module may be shared with the PRU in-band module (S1514). PRU #1 may determine whether to use the wireless charging service and determine that wireless power reception is necessary (S1516).

Prior to the wireless power transfer operation, the PTU and the PRU may perform a discovery operation in an OOB method (S1518). Immediately after power supply to PRU #1 is started, it may operate in a limited power state. For example, a device in a limited power state may operate in a limited discoverable mode for quick discovery for a certain period of time. The discovery procedure in the limited discoverable mode may include only an essential procedure for determining the existence of a peer device while minimizing power consumption.

Devices configured in the limited discovery capable mode may be discovered by other devices performing a limited or general device discovery procedure during a limited period of time. The limited discoverable mode may be generally used when the user performs a specific operation (e.g., in the case of wireless power transfer, when the device goes from an off state to an on state) that allows the device to be discovered only for a limited period of time.

For example, while the device plays the role of a peripheral, the device may support a limited discoverable mode. While the device performs only a broadcaster, observer, or central role, the device may not support limited discovery mode.

After performing the discovery operation, the PTU and PRU #1 may perform procedures such as power negotiation and authentication through OOB communication (S1520). When power negotiation and authentication are successfully completed, a power transfer operation may be performed (S1522).

Meanwhile, in the power-on state with all OOB stacks enabled (S1550), PRU #2 in a state in which power is not limited may share the power supply state of the PRU #2 OOB module with the PRU in-band module (S1552).

PRU #2 may perform a discovery procedure in a general discoverable mode (S1554). Accordingly, the PTU and PRU #2 may perform mutual detection or service discovery operation in both in-band and OOB (S1556). Specifically, the PTU and PRU #2 may perform mutual detection using both detection and service discovery on OOB, as well as magnetic field fluctuation detection.

PRU #2 may determine whether to use the wireless charging service and/or determine whether to use the general OOB service (S1558). If it is determined that the wireless charging service is required, the PRU #2 and the PTU may perform procedures such as power negotiation and authentication through OOB communication (S1560). When power negotiation and authentication are successfully completed, a power transfer operation may be performed (S1562).

As an additional example, examples of the present disclosure for connection termination when both in-band and OOB communication are supported in the wireless power transfer system will be described below.

When communication is performed only in the existing M (In-band), since the time when the communication is cut off and the time when the power transfer (or charging) is cut are the same, the communication may be stopped at the same time as charging is stopped. On the other hand, when dual channel communication is performed with M and OOB between the PRx and the first PTx, when the communication channel (i.e., IB) for exchanging charging-related data is disconnected and charging is interrupted, it is necessary to stop the communication channel (i.e. OOB) exchanging data other than charging related data. That is, if the interruption of OOB with the first PTx is not supported, charging with the first PTx is cut off and communication in the M is not performed, but communication with the first PTx may be in progress through OOB, which enables relatively long-distance communication than M. For example, while OOB communication with the first PTx is not cut off, M communication with the second PTx and charging may proceed. As such, if there is no definition of the connection termination time, the OOB channel is not unintentionally terminated even when charging from the first PTx is terminated, or when recharging with the second PTx, the OOB channel collides due to the unterminated OOB channel with the first PTx Problems may arise.

In addition, if OOB is not terminated within a specific time when the IB between the first PRx and the PTx is terminated, a hot swap problem may occur in which charging may proceed without authentication from the same PTx as the second PRx within a short time. For example, when authentication is performed through OOB, when the PTx is successfully authenticated for the 1st PRx, charging and IB of the 1st PRx are terminated, but OOB is not terminated, if the second PRx is located in the PTx within a short time, it may be recognized that the second PRx is unintentionally authenticated, and fast charging may be performed.

In order to solve this problem, it is necessary to define a condition for OOB termination for each stage of wireless power transfer.

For example, it may define the conditions under which OOB is terminated in the negotiation phase. For example, when IB is terminated by FOD in the negotiation phase, when the IB is terminated due to negotiation timeout and/or response timeout, when the IB is terminated by an illegal data packet, or when the IB is terminated by an EPT packet, an OOB that has already been connected or is attempting to connect may be terminated. In addition, when receiving a packet such as CE/RP8/RP in the negotiation phase, when receiving ATN, ND in response to SRQ/en, or when power transfer is in progress by switching to BPP due to the need to abort negotiation, an OOB that has been connected or is attempting to connect may be terminated. In addition, when IB termination due to PRx movement in the negotiation stage, charging by the user and IB communication are not possible, an OOB that has been connected or is attempting to connect may be terminated.

In addition, a condition that OOB is terminated in the power transfer step may be defined. For example, when an EPT packet is received in the power transfer phase, when an illegal data packet is received, when it is comms-loss-time such as control error timeout or receive power timeout, when it is action-timeout, when it is FOD, when it is IB termination due to movement of PRx, or when charging by the user and IB communication are not possible, an OOB that has been connected or is attempting to connect may be terminated.

The OOB termination time may configure the time until the expiration of a predetermined timer (e.g., tOobterminate) based on the time when the IB is terminated due to the CEP timeout, and end the OOB before the expiration of the predetermined timer. Since the protocol proceeds again in the ping phase after the IB is terminated, OOB may be terminated before the IB enters the starting phase.

In addition, in the case of a PTx supporting a plurality of PRx, in a state in which the PRx is being charged in the PTx, charging and IB of the first PRx are terminated by the user, and when the second PRx is charged by the user at the same location, the OOB of the first PRx may be terminated when the PTx is OOB-connected to the second PRx. That is, the charging start time of the second PRx may be determined as the connection termination time of the first PRx.

In relation to the connection termination operation, the PRx may inform the PTx which information may be provided among information (e.g., motion detection, etc.) that may be helpful in detecting the FOD, misalignment, etc. by the PTx. Based on this, the PTx may provide the PRx with information necessary for its detection, a detection range, a detection method, and information on a detection degree.

For example, when the PRx may distinguish and inform the user of FOD and misalignment error conditions, the PTx may distinguish the errors and notify the PRx of the occurrence of the error. In FOD, objects significantly change self-inductance that directly affects the resonant frequency, whereas misalignment affects the coupling rate more than the self-inductance.

Figure 16:
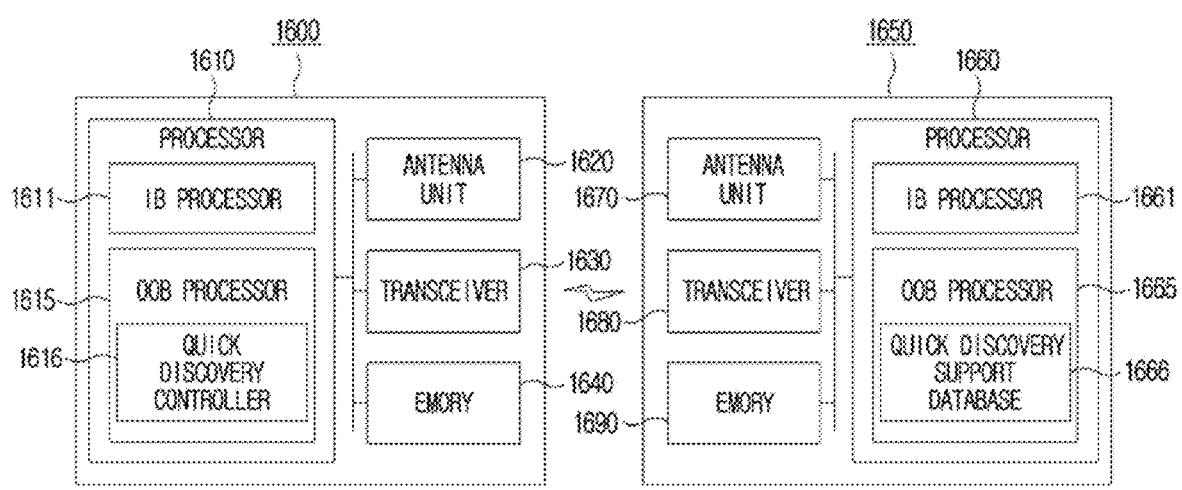
FIG. 16 is a diagram illustrating a configuration of a first device and a second device to which the present disclosure may be applied.

FIG. 16 is a diagram illustrating a configuration of the first device and the second device to which the present disclosure is applicable.

The first device 1600 may include a processor 1610, an antenna unit 1620, a transceiver 1630, and a memory 1640.

The processor 1610 may perform baseband-related signal processing and may include an in-band (IB) processing unit 1611 and an out-of-band (OOB) processing unit 1615. The IB processing unit 1611 and the OOB processing unit 1615 may exchange information with each other. The IB processing unit 1611 may process a power transmission/reception operation and an operation of exchanging information related to power transmission/reception. The OOB processing unit 1615 may process an operation of exchanging information related to power transmission/reception and information related to an additional service. In addition, the processor 1610 may control the overall operation of the first device 1600.

The antenna unit 1620 may include one or more physical antennas. The transceiver 1630 may include a radio frequency (RF) transmitter and an RF receiver. In addition, the transceiver may include an IB communication module and an OOB communication module, each of which may be controlled by the IB processing unit 1611 and the OOB processing unit 1615. The memory 1640 may store information processed by the processor 1610 and software, an operating system, and an application related to the operation of the first device 1600, and may include components such as a buffer.

The processor 1610 of the first device 1600 may be configured to implement the operation of the first device (or the power transmitter (PTx or PTU)) in the embodiments described in the present disclosure.

For example, the OOB processing unit 1615 of the processor 1610 of the first device 1600 may include a quick discovery control unit 1616.

The quick discovery control unit 1616 may receive the advertisement data from the second device 1650 and acquire a first service or characteristic of the second device 1650 on the OOB channel based on the received advertisement data. Also, the quick discovery control unit 1616 may transmit the first service or characteristic to the IB processing unit 1611, and the IB processing unit 1611 may perform wireless power transfer based on the first service or characteristic. After power transfer is started, the fast discovery controller 1616 may acquire a second service or characteristic of the second device 1650. The first service or characteristic may have a higher priority than the second service or characteristic.

The second device 1650 may include a processor 1660, an antenna unit 1670, a transceiver 1680, and a memory 1690.

The processor 1660 may perform baseband-related signal processing and may include an in-band (IB) processing unit 1661 and an out-of-band (OOB) processing unit 1665. The IB processing unit 1661 and the OOB processing unit 1665 may exchange information with each other. The IB processing unit 1661 may process a power transmission/reception operation and an exchange operation of information related to power transmission/reception. The OOB processing unit 1665 may process an operation of exchanging information related to power transmission/reception and information related to an additional service. In addition, the processor 1660 may control the overall operation of the second device 1660.

The antenna unit 1670 may include one or more physical antennas. The transceiver 1680 may include an RF transmitter and an RF receiver. In addition, the transceiver may include an IB communication module and an OOB communication module, each of which may be controlled by the IB processing unit 1661 and the OOB processing unit 1665. The memory 1690 may store information processed by the processor 1660 and software, an operating system, and an application related to the operation of the second device 1650, and may include components such as a buffer.

The processor 1660 of the second device 1650 may be configured to implement the operation of the second device (or the power receiver (PRx or PRU)) in the embodiments described in the present disclosure.

For example, the OOB processing unit 1665 of the processor 1660 of the second device 1650 may include a quick discovery support database 1666.

The quick discovery support database 1666 may distinguish and store a service or characteristic that the specific device can acquire first, based on a predetermined criterion for the specific device. The predetermined criterion may be a priority, and identification information (a handle, an identifier, etc.) for various services or characteristics may be stored together according to the priority.

In response to the request of the first device 1600, the quick discovery support database 1666 may provide the first service or characteristic to the first device 1600. After the wireless power transfer from the first device 1600 is started, the fast discovery support database 1666 may provide a second service or characteristic to the first device 1600 according to the request of the first device 1600. The first service or characteristic may have a higher priority than the second service or characteristic.

In the operations of the first device 1600 and the second device 1650, the descriptions of the power transferring device and the power receiving device in the examples of the present disclosure may be applied in the same manner, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a quick random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor(s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:

1. A method performed by a power transmitter (PTx) in a wireless power transfer system, the method comprising:
receiving, by the PTx, at least one advertisement data from a power receiver (PRx) in out-of-band (OOB);
obtaining, by the PTx, a first at least one service or characteristic of the PRx in the OOB, based on the advertisement data;
initiating power transfer from the PTx to the PRx in in-band based on the first at least one service or characteristic; and
obtaining, by the PTx, a second at least one service or characteristic of the PRx in the OOB, after initiating the power transfer,
wherein the at least one advertisement data from the PRx includes information related to a quick discovery which enables a discovery based on limited information about the PRx,
wherein the second at least one service or characteristic of the PRx includes a remaining at least one service or characteristic of services or characteristics of the PRx other than the first at least one service or characteristic of the PRx, and
wherein a renegotiation with the PRx is performed during the power transfer at least based on the second at least one service or characteristic.

2. The method of claim 1, wherein:
the advertisement data includes information on whether the PRx supports wireless power transfer.

3. The method of claim 1, wherein:
the first service or characteristic is a service or characteristic related to wireless power transfer.

4. The method of claim 1, further comprising:
resuming wireless power transfer by reconfiguring a wireless power transfer parameter after obtaining the second service or characteristic.

5. The method of claim 1, further comprising:
initiating an additional service based on the second service or characteristic, while maintaining the initiated wireless power transfer after obtaining the second service or characteristic.

6. The method of claim 1, wherein:
the advertisement data includes information on a priority of each of the first service or characteristic and the second service or characteristic.

7. The method of claim 6, wherein:
the first service or characteristic has a higher priority than the second service or characteristic.

8. The method of claim 1, wherein:
the OOB includes a BLE (Bluetooth Low Energy) channel.

9. The method of claim 1, wherein:
the in-band includes a wireless power transfer channel or Qi channel.

10. A power transmitter (PTx) in a wireless power transfer system, the PTx comprising:
an out-of-band (OOB) module for performing signal transmission and reception through the OOB;
an in-band module for performing signal and power transmission and reception through in-band; and
a processor for controlling the OOB module and the in-band module, wherein the processor is configured to:
receive at least one advertisement data from a power receiver (PRx) through the OOB module;
obtain a first at least one service or characteristic of the PRx through the OOB module, based on the advertisement data;
initiate power transfer to the PRx through the in-band module based on the first at least one service or characteristic;
obtain the second at least one service or characteristic of the PRx through the OOB module after initiating the power transfer,
wherein the at least one advertisement data from the PRx includes information related to a quick discovery which enables a discovery based on limited information about the PRx,
wherein the second at least one service or characteristic of the PRx includes a remaining at least one service or characteristic of services or characteristics of the PRx other than the first at least one service or characteristic of the PRx, and
wherein a renegotiation with the PRx is performed during the power transfer at least based on the second at least one service or characteristic.

11. The PTx of claim 10, wherein:
the advertisement data includes information on whether the PRx supports wireless power transfer.

12. The PTx of claim 10, wherein:
the first service or characteristic is a service or characteristic related to wireless power transfer.

13. The PTx of claim 10, wherein:
the processor is configured to resume wireless power transfer by reconfiguring a wireless power transfer parameter after obtaining the second service or characteristic.

14. The PTx of claim 10, wherein:
the processor is configured to initiate an additional service based on the second service or characteristic, while maintaining the initiated wireless power transfer after obtaining the second service or characteristic.

15. The PTx of claim 10, wherein:
the advertisement data includes information on a priority of each of the first service or characteristic and the second service or characteristic.

16. The PTx of claim 15, wherein:
the first service or characteristic has a higher priority than the second service or characteristic.

17. The PTx of claim 10, wherein:
the OOB module is a BLE (Bluetooth Low Energy) module.

18. The PTx of claim 10, wherein:
the in-band module is a wireless power transfer module or Qi module.

* * * * *